United States Patent
Hanhart et al.

(10) Patent No.: US 12,149,739 B2
(45) Date of Patent: Nov. 19, 2024

(54) SAMPLE DERIVATION FOR 360-DEGREE VIDEO CODING

(71) Applicant: Vid Scale, Inc., Wilmington, DE (US)

(72) Inventors: Philippe Hanhart, La Conversion (CH); Yuwen He, San Diego, CA (US); Yan Ye, San Diego, CA (US)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 18/105,290

(22) Filed: Feb. 3, 2023

(65) Prior Publication Data

US 2023/0188752 A1 Jun. 15, 2023

Related U.S. Application Data

(63) Continuation of application No. 17/280,183, filed as application No. PCT/US2019/053055 on Sep. 26, 2019, now Pat. No. 11,601,676.

(Continued)

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/132* (2014.11);
(Continued)

(58) Field of Classification Search
CPC .. H04N 19/597; H04N 19/172; H04N 19/184; H04N 19/105; H04N 19/132; H04N 19/51
See application file for complete search history.

(56) References Cited

U.S. PATENT DOCUMENTS 9,805,475 B2 * 10/2017 Rubinstein ............. G06T 7/262
10,404,992 B2 9/2019 Rapaka et al.
(Continued)

FOREIGN PATENT DOCUMENTS

| CN | 105850122 A | 8/2016 |
|---|---|---|
| CN | 107852498 A | 3/2018 |

(Continued)

OTHER PUBLICATIONS

360LIB, Available at <https://jvet.hhi.fraunhofer.de/svn/svn_360Lib/>, 1 page.

(Continued)

*Primary Examiner* — Zaihan Jiang
(74) *Attorney, Agent, or Firm* — Condo Roccia Koptiw LLP

(57) ABSTRACT

Systems, methods, and instrumentalities are disclosed for performing horizontal geometry padding on a current sample based on receiving a wraparound enabled indication that indicates whether a horizontal wraparound motion compensation is enabled. If the horizontal wraparound motion compensation is enabled based on the wraparound enabled indication, a video coding device may determine a reference sample wraparound offset of a current sample in a picture. The reference sample wraparound offset may indicate a face width of the picture. The video coding device may determine a reference sample location for the current sample based on the reference sample wraparound offset, a picture width of the picture, and a current sample location. The video coding device may predict the current sample based on the reference sample location in a horizontal direction. Repetitive padding or clipping may be used in the vertical direction.

20 Claims, 18 Drawing Sheets

Related U.S. Application Data

(60) Provisional application No. 62/737,303, filed on Sep. 27, 2018.

(51) Int. Cl.
*H04N 19/132* (2014.01)
*H04N 19/172* (2014.01)
*H04N 19/184* (2014.01)
*H04N 19/51* (2014.01)

(52) U.S. Cl.
CPC ......... *H04N 19/172* (2014.11); *H04N 19/184* (2014.11); *H04N 19/51* (2014.11)

(56) References Cited

U.S. PATENT DOCUMENTS

| | | |
|---|---|---|
| 2005/0201464 A1 | 9/2005 | Lee |
| 2005/0259743 A1* | 11/2005 | Payson ................ H04N 19/61 375/E7.133 |
| 2006/0088191 A1 | 4/2006 | Zhang et al. |
| 2009/0168893 A1* | 7/2009 | Schlanger ............ H04N 19/44 375/E7.2 |
| 2011/0317769 A1* | 12/2011 | Tanaka ................. H04N 19/46 375/E7.2 |
| 2012/0155543 A1* | 6/2012 | Chen ..................... H04N 19/51 375/E7.026 |
| 2013/0100132 A1* | 4/2013 | Katayama ............ H04N 13/156 345/420 |
| 2014/0301464 A1 | 10/2014 | Wu et al. |
| 2015/0195564 A1 | 7/2015 | Ramasubramonian et al. |
| 2017/0085917 A1* | 3/2017 | Hannuksela ......... H04N 19/136 |
| 2017/0214937 A1 | 7/2017 | Lin et al. |
| 2017/0336705 A1* | 11/2017 | Zhou ........................ G01S 3/00 |
| 2018/0115706 A1* | 4/2018 | Kang ...................... G06T 5/70 |
| 2018/0122052 A1* | 5/2018 | Lebrun .................... G06T 7/97 |
| 2018/0288356 A1* | 10/2018 | Ray ....................... H04N 19/124 |
| 2020/0213617 A1* | 7/2020 | Choi ..................... H04N 19/597 |
| 2020/0260063 A1* | 8/2020 | Hannuksela ... H04N 21/234345 |
| 2020/0260070 A1* | 8/2020 | Yoo ....................... H04N 19/103 |

FOREIGN PATENT DOCUMENTS

| | | |
|---|---|---|
| EP | 3301914 A1 | 4/2018 |
| JP | 2008-510359 A | 4/2008 |
| RU | 2332809 C2 | 8/2008 |
| RU | 2648592 C2 | 3/2018 |
| WO | 2017/051072 A1 | 3/2017 |
| WO | 2017/162912 A1 | 9/2017 |
| WO | 2017/220012 A1 | 12/2017 |
| WO | 2018/009746 A1 | 1/2018 |

OTHER PUBLICATIONS

Abbas et al., "AHG8: New GoPro Test Sequences for Virtual Reality Video Coding", JVET-D0026, GoPro, Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-6.
Abbas et al., "AHG8: New Test Sequences for Spherical Video Coding from GoPro", JVET-G0147, GoPro, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Asbun et al., "AHG8: InterDigital Test Sequences for Virtual Reality Video Coding", JVET-D0039, InterDigital Communications, Inc., Joint Video Exploration Team (JVET) of ITU-T SG 16 WP 3 and ISO/IEC JTC 1/SC 29/WG 11, 4th Meeting: Chengdu, CN, Oct. 15-21, 2016, 4 pages.
Asbun et al., "InterDigital Test Sequences for Virtual Reality Video Coding", JVET-G0055, InterDigital Communications, Inc., Joint Video Exploration Team (JVET) of ITU-T SG 16 WP 3 and ISO/IEC JTC 1/SC 29/WG 11, 7th Meeting: Torino, IT, Jul. 13-21, 2017, 4 pages.
Auwera et al., "AHG8: ACP with Padding for 360-Degree Video", JVET-G0071_R1, Qualcomm Inc., Joint Video Exploration Team (JVET) of ITU-T SG 16 WP 3 and ISO/IEC JTC 1/SC 29/WG 11, 7th Meeting: Torino, Italy, Jul. 13-21, 2017, pp. 1-11.
Baroncini et al., "Results of the Joint Call for Evidence on Video Compression with Capability beyond HEVC", JVET-G1004-V2, JVET, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-17.
Boyce et al., "EE4: Padded ERP (PERP) Projection Format", JVET-G0098, Intel Corp., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-10.
Boyce et al., "JVET Common Test Conditions and Evaluation Procedures for 360° Video", JVET-F1030-V4, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-7.
Choi et al., "Study of ISO/IEC DIS 23000-20 Omnidirectional Media Format", Systems, ISO/IEC JTC1/SC29/WG11 N16950, Torino, Italy, Jul. 2017, 131 pages.
Choi, Byeongdoo, "Technologies under Consideration for Omnidirectional Media Application Format", Systems Subgroup, ISO/IEC JTC1/SC29/WG11 N15946, San Diego, CA, US, Feb. 2016, 16 pages.
Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.
Facebook360, "Facebook 360 Video", Available at <https://facebook360.fb.com/>, pp. 1-5.
GitHub, "Facebook's Equirectangular to Cube Map Tool on GitHub", Transform 360, Available at <https://github.com/facebook/transform?files=1>, pp. 1-3.
Google, "Bringing Pixels Front and Center in VR Video", Available at <https://www.blog.google/products/google-vr/bringing-pixels-front-and-center-vr-video/>, Mar. 14, 2017, pp. 1-8.
Google VR, "Google Cardboard", Available at <https://www.google.com/get/cardboard/>, pp. 1-4.
Hanhart et al., "JVET Common Test Conditions and Evaluation Procedures for 360° Video", JVET-K1012-V1, JVET, Joint Video Exploration Team (JVET) of ITU-T SG 16 WP 3 and ISO/IEC JTC 1/SC 29/WG 11, 11th Meeting: Ljubljana, SI, Jul. 10-18, 2018, pp. 1-8.
Hanhart et al., "AHG8: Horizontal Geometry Padding for PERP", Joint Video Experts Team (JVET) of ITU-T SG 16 WP 3 and ISO/IEC JTC 1/SC 29/WG 11, 11th Meeting: Ljubljana, SI; InterDigital Communications, Inc.; JVET-K0333-R1, Jul. 10-18, 2018, 4 pages.
He et al., "Motion Compensated Prediction with Geometry Padding for 360 Video Coding", IEEE Visual Communications and Image Processing (VCIP), St. Petersburg, USA, Dec. 10-13, 2017, 4 pages.
He et al., "AHG8: Geometry Padding for 360 Video Coding", Joint Video Exploration Team (JVET) of ITU-T SG 16 WP 3 and ISO/IEC JTC1/SC 29/WG 11, 4th Meeting: Chengdu, CN; InterDigital Communications Inc.; JVET-D0075, Oct. 15-21, 2016, 10 pages.
HTC, "HTC Vive", Available at <https://www.htcvive.com/US/>, pp. 1-3.
ISO/IEC, "Requirements for OMAF", Requirements, ISO/IEC JTC1/SC29/WG11 N16143, San Diego, CA, US, Feb. 2016, 2 pages.
Kuzyakov et al., "Next-Generation Video Encoding Techniques for 360 Video and VR", Facebook Code, Available at <https://code.facebook.com/posts/1126354007399553/next-generation-video-encoding-techniques-for-360-video-and-vr/>, Jan. 21, 2016, pp. 1-6.
Norkin et al., "Call for Test Materials for Future Video Coding Standardization", JVET-B1002, ITU-T Q6/16 Visual Coding (VCEG) and ISO/IEC JTC1/SC29/WG11 Coding of Moving Pictures and Audio (MPEG), Joint Video Exploration Team (JVET) of ITU-T SG 16 WP 3 and ISO/IEC JTC 1/SC 29/WG 11, 2nd Meeting: San Diego, USA, Feb. 20-26, 2016, pp. 1-4.
Oculus, "Oculus Rift", Available at <https://www.oculus.com/en-us/rift/>, pp. 1-19.
Schwarz et al., "Tampere Pole Vaulting Sequence for Virtual Reality Video Coding", JVET-D0143, Nokia, Tampere University of Technology, Rakka Creative, Joint Video Exploration Team (JVET) of

(56) References Cited

OTHER PUBLICATIONS

ITU-T SG 16 WP 3 and ISO/IEC JTC 1/SC 29/WG 11, 4th Meeting: Chengdu, CN, Oct. 15-21, 2016, pp. 1-2.
Segall et al., "Joint Call for Proposals on Video Compression with Capability Beyond Hevc", JVET-H1002 (V6), Editors, Joint Video Exploration Team (JVET) of ITU-T SG 16 WP 3 and ISO/IEC JTC 1/SC 29/WG 11, 8th Meeting: Macao, CN, Oct. 18-24, 2017, 27 pages.
Sullivan et al., "Meeting Notes of the 3rd Meeting of the Joint Video Exploration Team (JVET)", JVET-C1000, Responsible Coordinators, Joint Video Exploration Team (JVET) of ITU-T SG 16 WP 3 and ISO/IEC JTC 1/SC 29/WG 11, 3rd Meeting: Geneva, CH, May 26-Jun. 1, 2016, pp. 1-73.
Sullivan et al., "Meeting Report of the 10th Meeting of the Joint Video Experts Team (JVET)", JVET-J1000, Chairs of JVET, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-125.
Sun et al., "Test Sequences for Virtual Reality Video Coding from LetinVR", JVET-G0053, Letin VR Digital Technology Co., Ltd., Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Sun et al., "Test Sequences for Virtual Reality Video Coding from LetinVR", JVET-D0179, Letin VR Digital Technology Co., Ltd., Joint Video Exploration Team (JVET) of ITU-T SG 16 WP 3 and ISO/IEC JTC 1/SC 29/WG 11, 4th Meeting: Chengdu, CN, Oct. 15-21, 2016, pp. 1-5.
Thomas et al., "5G and Future Media Consumption", TNO, ISO/IEC JTC1/SC29/WG11 MPEG2016/m37604, San Diego, CA, US, Feb. 2016, 10 pages.
Wien et al., "Joint Call for Evidence on Video Compression with Capability beyond HEVC", JVET-F1002, Joint Video Exploration Team (JVET), of ITU-T SG 16 WP 3 and ISO/IEC JTC 1/SC 29/WG 11, Hobart, AU, Mar. 31-Apr. 7, 2017, pp. 1-11.
Ye et al., "Algorithm Descriptions of Projection Format Conversion and Video Quality Metrics in 360Lib", JVET-F1003-V1, Editors, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-33.
Ye et al., "Algorithm Descriptions of Projection Format Conversion and Video Quality Metrics in 360Lib Version 7", JVET-K1004, Editors, Joint Video Exploration Team (JVET) of ITU-T SG 16 WP 3 and ISO/IEC JTC 1/SC 29/WG 11, 11th Meeting: Ljubljana, SI, Jul. 10-18, 2018, pp. 1-45.
Youtube, "360 Video", Virtual Reality, Available at <https://www.youtube.com/channel/UCzuqhhs6NWbgTzMuM09WKDQ>, pp. 1-3.
Zhou, Minhua, "AHG8: A Study on Quality Impact of Line Re-Sampling Rate in EAP", JVET-G0051, Broadcom Limited, Joint Video Exploration Team (JVET) of ITU-T SG 16 WP 3 and ISO/IEC JTC 1/SC 29/WG 11, 7th Meeting: Torino, IT, Jul. 13-21, 2017, pp. 1-5.
Zhou, Minhua, "AHG8: Unrestricted Motion Compensation for 360 Video in ERP Format", JVET-E0065, Broadcom Limited, Joint Video Exploration Team (JVET) of ITU-T SG 16 WP 3 and ISO/IEC JTC 1/SC 29/WG 11, 5th Meeting: Geneva, CH, Jan. 12-20, 2017, pp. 1-3.
105850122 (A), US 2015/0195564 (A1).
107852498 (A), US. Pat. No. 10,404,992 (B2).
ISO/IEC, "Report of the 120th Meeting," ISO/IEC JTC 1/SC 29/WG 11 No. n17101, Macau SAR, CN, Oct. 2017, 328 pages.

\* cited by examiner

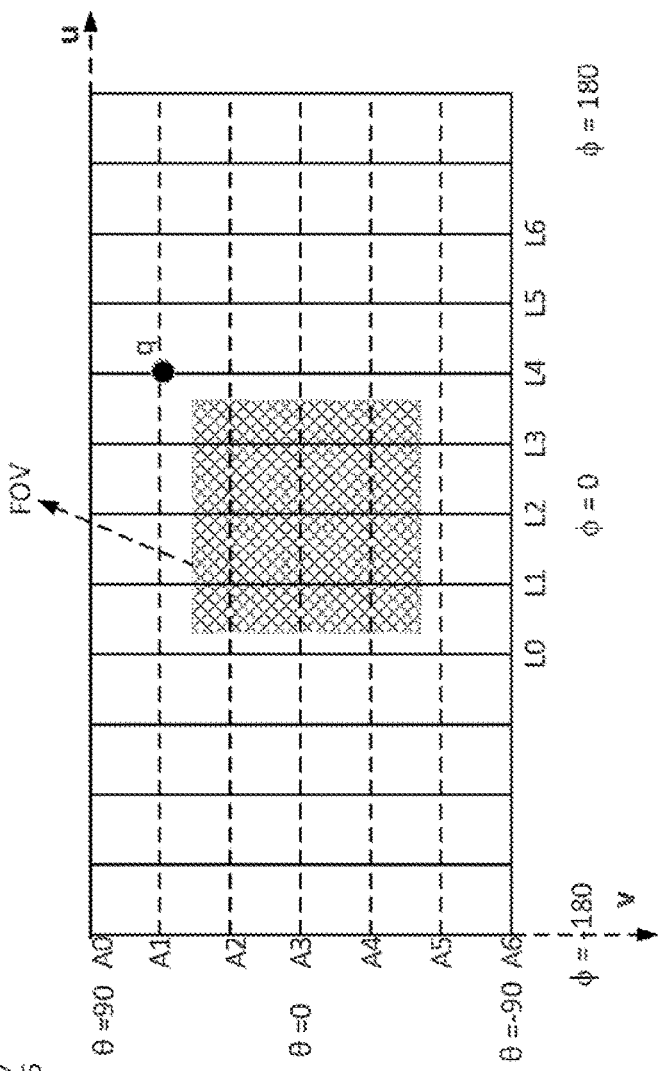
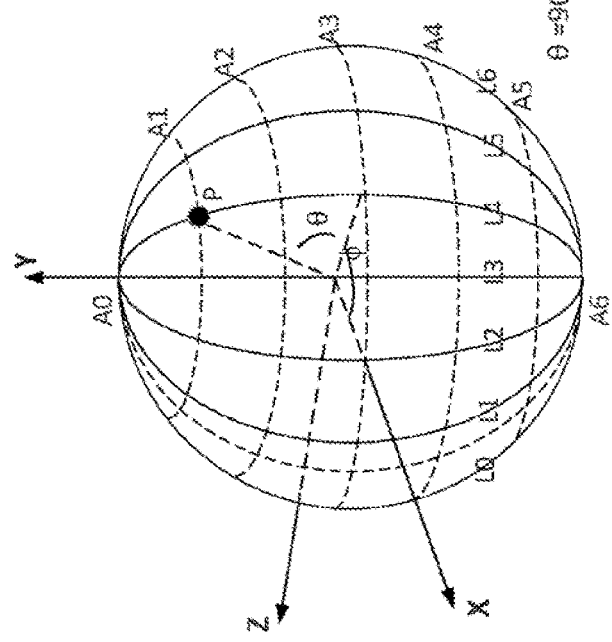
FIG. 1A
FIG. 1B

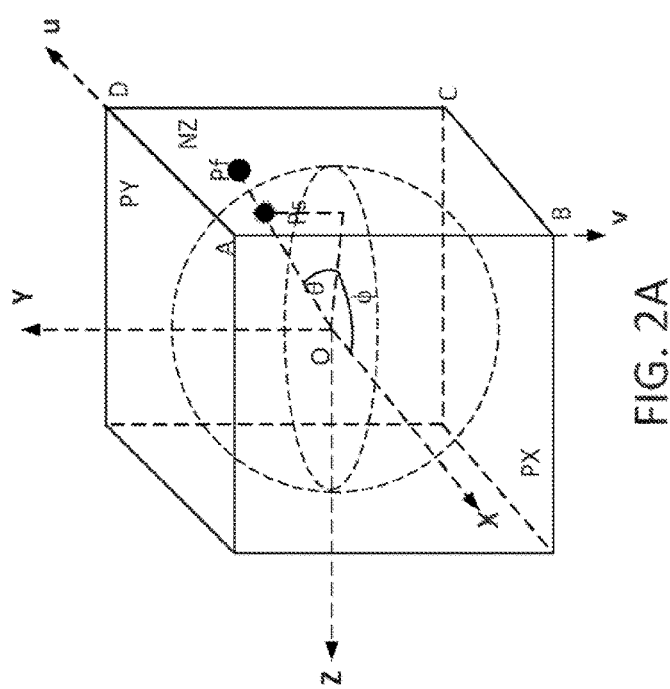

FIG. 15

SAMPLE DERIVATION FOR 360-DEGREE VIDEO CODING

CROSS REFERENCE

This application is a continuation application of U.S. Non-Provisional application Ser. No. 17/280,183, filed Mar. 25, 2021, which is the National Stage Entry under 35 U.S.C. § 371 of Patent Cooperation Treaty Application No. PCT/US2019/053055, filed Sep. 26, 2019, which claims the benefit of U.S. Provisional Application No. 62/737,303, filed on Sep. 27, 2018, the contents of which are incorporated by reference herein.

BACKGROUND

Virtual reality (VR) is increasingly entering our daily lives. VR has many application areas, including healthcare, education, social networking. industry design/training, game, movie, shopping, entertainment, etc. VR is gaining attention from industries and consumers because VR is capable of bringing an immersive viewing experience. VR creates a virtual environment surrounding the viewer and generates a true sense of "being there" for the viewer. How to provide the full real feeling in the VR environment is important for a users experience. For example, the VR system may support interactions through posture, gesture, eye gaze, voice, etc. To allow the user to interact with objects in the VR world in a natural way, the VR may provide haptic feedback to the user.

SUMMARY

Systems, methods, and instrumentalities are disclosed for performing horizontal geometry padding on a current sample based on receiving a wraparound enabled indication that indicates a horizontal wraparound motion compensation is enabled.

A video coding device may receive a picture associated with a video content in a bitstream. A video coding device described herein may be or may include an encoder and/or a decoder. The picture may be or may include a frame-packed picture. The video coding device may receive a wraparound enabled indication. For example, the video coding device may receive a wraparound enabled indication in a sequence level. The wraparound enabled indication may indicate whether a horizontal wraparound motion compensation is enabled or disabled. The wraparound enabled indication may be or may include a wraparound enabled flag that indicates whether the horizontal wraparound motion compensation is enabled or disabled.

Based on the wraparound enabled indication indicating that the horizontal wraparound motion compensation is enabled, the video coding device may determine a reference sample wraparound offset of a current sample in the picture. In examples, the video coding device may receive an offset indication of the reference sample wraparound offset in the bitstream. The reference sample wraparound offset may be determined based on the offset indication. The reference sample wraparound offset may indicate a face width of the picture. In examples, the video coding device may receive a size indication indicative of a face width of the picture. For example, the size indication may be or may include a width of a guard band in luma samples. The video coding device may calculate the face width of the picture based on the size indication and may use the calculated face width as the reference sample wraparound offset. In examples, the guard band may have the same width. In examples. the guard band may have different width.

The video coding device may determine a reference sample location for the current sample based on the reference sample wraparound offset, a picture width of the picture, and a current sample location. The video coding device may receive the reference sample wraparound offset in a sequence level.

In examples. the video coding device may determine whether an original reference sample location (e.g., a raw reference sample location) associated with the current sample location is outside of the picture. If the original reference sample location is outside of the picture, the video coding device may calculate the reference sample location for horizontal geometry padding. For example, the video coding device may calculate the reference sample location by applying the reference sample wraparound offset to a horizontal sample coordinate associated with the original reference sample location.

In examples, the video coding device may calculate a face width of the picture based on the reference sample wraparound offset and the picture width of the picture. The video coding device may identify the current sample location in the picture. The video coding device may determine whether an original reference sample location is outside of the picture. If the original reference sample location is outside of a leftmost horizontal boundary of the picture, the video coding device may determine the reference sample location by adding the reference sample wraparound offset to a horizontal sample coordinate associated with the original reference sample location. If the original reference sample location is outside of a rightmost horizontal boundary of the picture, the video coding device may determine the reference sample location by subtracting the reference sample wraparound offset from the horizontal sample coordinate associated with the original reference sample location.

The video coding device may predict the current sample based on the reference sample location.

The video coding device may determine whether the horizontal wraparound motion compensation is disabled based on the wraparound enabled indication. If the wraparound enabled indication indicates that the horizontal wraparound motion compensation is disabled, the video coding device may identify the current sample location in the picture. The video coding device may determine whether the current sample location is located at a horizontal boundary of the picture. The video coding device may determine whether the reference sample location is located outside of the horizontal boundary of the picture. If the video coding device determines that the reference sample location is located outside of the horizontal boundary of the picture, the video coding device may identify the reference sample location on the horizontal boundary of the picture. The video coding device may predict the current sample based on the reference sample location.

The picture may be or may include with an equirectangular projection (ERP) format, an equal-area projection (EAP) format, or an adjusted equal-area projection (AEP) format.

The video coding device may determine whether to receive an offset indication of the reference sample wraparound offset based on the wraparound enabled indication. If the video coding device determines that the wraparound enabled indication is enabled, the video coding device may parse the bitstream to receive the offset indication of the reference sample wraparound offset. If the video coding device determines that the wraparound enabled indication is disabled, the video coding device may skip parsing the bitstream and skip receiving the offset indication of the reference sample wraparound offset.

An indication may be signaled (e.g., in a bitstream) to enable geometry padding. The correct position of one or more spherical neighbors may be determined. Geometry padding may account for the position and/or size of guard bands to compute the correct position of one or more spherical neighbors. The position and/or size of guard bands may have been added when packing one or more faces within the picture (e.g., before encoding). One or more indications related to geometry padding may be signaled to indicate whether geometry padding is applied and/or specify guard bands.

For projection geometries that includes a face (e.g., a single face), such as ERP, EAP, AEP, and/or the like projection formats, geometry padding may be performed in a horizontal direction. When geometry padding is performed in the horizontal direction, repetitive padding may be used in the vertical direction. A sample position may be determined as a horizontal sample coordinate may be wrapped within a coded picture. A vertical sample coordinate may be clipped to one or more coded picture boundaries, e.g., as in repetitive padding. The integer sample derivation process and/or fractional sample interpolation process for inter prediction (e.g., using horizontal geometry padding) associated with a single face-based projection geometry may be determined.

BRIEF DESCRIPTION OF THE DRAWINGS

FIG. 1A illustrates an example spherical sampling in longitude and latitude.

FIG. 1B illustrates an example two-dimensional (20) planar with equirectangular projection.

FIG. 2A illustrates an example three-dimensional (3D) geometric structure for cubemap projection (CMP).

FIG. 2B illustrates an example 2D planer for six faces for CMP.

FIG. 48 illustrates an example padded ERP picture.

FIG. 15 illustrates an example integer sample (e.g., shaded block with upper-case letters) and fractional sample positions (e.g., un-shaded blocks with lower-case letters) for quarter sample luma interpolation.

DETAILED DESCRIPTION

Figure 3B:
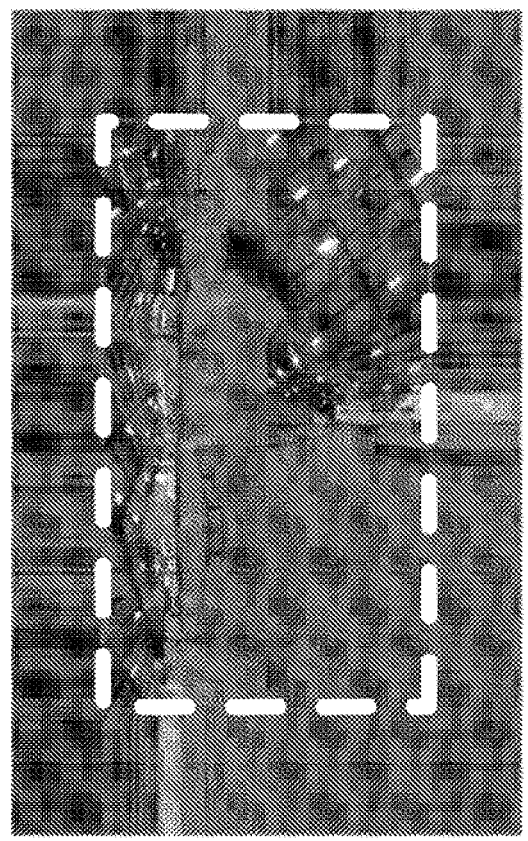
FIG. 3B illustrates an example picture with padded boundaries using CMP.

A detailed description of illustrative embodiments will now be described with reference to the various figures. Although this description provides a detailed example of possible implementations, it should be noted that the details are intended to be exemplary and in no way limit the scope of the application.

360-degree videos described herein may be or may include spherical videos, omnidirectional videos, virtual reality (VR) videos, panorama videos, immersive videos (e.g., light field videos that may include 6 degree of freedom), point cloud videos, and/or the like.

A VR system may use a 360-degree video to provide the users the capability to view a scene from 360-degree angles in the horizontal direction and 180-degree angles in the vertical direction. The VR system and/or the 360-degree video may be considered to be the direction for media consumption beyond ultra high definition (UHD) service. Work on the requirements and potential technologies for omnidirectional media application format may be performed to improve the quality of 360-degree video in a VR system and/or to standardize a processing chain for clients interoperability. Free view TV (FTV) may test the performance of one or more of the following: (1) 360-degree video (e.g., omnidirectional video) based system; (2) multi-view based system.

A VR system may include a processing chain. The processing chain may be or may include capturing, processing. display. and/or applications. With respect to capturing, a VR system may use one or more cameras to capture scenes from different divergent views (e.g., 6 to 12 views). The views may be stitched together to form a 360-degree video in a high resolution (e.g., 4K or 8K). On a client side and/or a user side, the VR system may include a computation platform, a head mounted display (HMD), and/or one or more head tracking sensors. The computation platform may receive and/or decode a 360-degree video, and/or generating a viewport for display. Two pictures, one for each eye, may be rendered for the viewport. The two pictures may be displayed in an HMD (e.g., for stereo viewing). Lens may be used to magnify the image displayed in the HMD for better viewing. The head tracking sensor may keep (e.g., constantly keep) track of the viewers head orientation, and/or may feed the orientation information to the system to display the viewport picture for that orientation.

A VR system may provide a touch device for a viewer to interact with objects in the virtual world. A VR system may be driven by a workstation with a GPU support. A VR system may use a smartphone as a computation platform, an HMD display, and/or a head tracking sensor. The spatial HMD resolution may be 2160×1200, the refresh rate may be 90 Hz, and/or the field of view (FOV) may be 110 degrees. The sampling density for a head tracking sensor may be 1000 Hz, which may capture fast movement. A VR system may include a lens and/or a cardboard, and/or may be driven by a smartphone.

360-degree videos may be compressed and/or delivered, for example, using dynamic adaptive streaming over HTTP (DASH)-based video streaming techniques. 360-degree video delivery may be implemented, for example, using a spherical geometry structure to represent 360-degree information. For example, the synchronized multiple views captured by the multiple cameras may be stitched on a sphere (e.g., as an integral structure). The sphere information may be projected onto a 2D planar surface via geometry conversion (e.g., equirectangular projection and/or cubemap projection).

Equirectangular projection may be performed. FIG. 1A shows an example sphere sampling in longitudes ($\varphi$) and latitudes ($\theta$). FIG. 1B shows an example sphere being projected onto a 2D plane using equirectangular projection (ERP). The longitude $\varphi$ in the range $[-\pi, \pi]$ may be referred to as yaw. and the latitude $\theta$ in the range $[-\pi/2, \pi/2]$ may be referred to as pitch in aviation. $\pi$ may be the ratio of a circle's circumference to its diameter. Coordinates (x, y, z) may represent a point's coordinates in a 3D space. Coordinates (ue, ye) may represent a point's coordinates in a 2D plane after ERP. ERP may be represented mathematically, for example, as shown in (1) and (2).

$$ue=(\phi/(2*\pi)+0.5)*W \quad (1)$$

$$ve=(0.5-\theta/\pi)*H \quad (2)$$

W and H may be the width and height of the 2D planar picture. As seen in FIG. 1A, the point P, the cross point between longitude L4 and latitude A1 on the sphere, may be mapped to a unique point q in FIG. 1B in the 2D plane using (1) and/or (2). Point q in the 2D plane shown in FIG. 1B may be projected back to point P on the sphere shown in FIG. 1A, for example via inverse projection. The field of view (FOV) in FIG. 1B shows an example where the FOV in a sphere is mapped to a 2D plane with a viewing angle along the X axis at about 110 degrees.

One or more 360-degree videos may be mapped to 2D videos. The mapped video may be encoded using a video codec (e.g., H.264, HEVC, and/or the like) and/or may be delivered to a client. At the client side, the equirectangular video may be decoded and/or rendered based on a users viewport (e.g., by projecting and/or displaying the portion belonging to FOV in an equirectangular picture onto an HMD). A spherical video may be transformed to a 2D planar picture for encoding with ERP. The characteristic of an equirectangular 2D picture may be different from a non-equirectangular 2D picture (e.g., a rectilinear video). A top portion of a picture, which may correspond to a north pole. and a bottom portion of a picture. which may correspond to a south pole, may be stretched (e.g., when compared to a middle portion of the picture, which may correspond to an equator). The stretching may indicate that the equirectangular sampling in the 2D spatial domain may be uneven. A motion field in the 2D equirectangular picture may be complex along the temporal direction.

The left and/or right boundaries of the ERP picture may be coded (e.g., coded independently). Objectionable visual artefacts in a form of face seams in the reconstructed video may be created, for example, when the reconstructed video is used to render a viewport which is then displayed to the user via an HMD or via a 2D screen. Padding of N (e.g., 8) luma samples may be applied on the left and/or the right sides of the picture. The padded ERP picture including the padding samples may be encoded. The reconstructed ERP with padding may be converted back. For example, the reconstructed ERP with padding may be converted back by blending the duplicated samples and/or cropping the padded areas (e.g., after decoding).

Lambert cylindrical equal-area projection (EAP) may use the same sampling in longitude as ERP. Lambert cylindrical EAP may compensate for an increasing horizontal sampling density near the poles by decreasing the vertical sampling density. In EAP, the vertical sampling density may be set to $\cos(\varphi)$, and the combined sampling density may be constant throughout the sphere. Adjusted equal-area projection (AEP) may be a generalization of EAP. AEP may introduce a parameter that may control line resampling rate in the projection.

Cubemap projection may be performed. The top and bottom portions of an ERP picture, which may correspond to a north and south pole respectively, may be stretched (e.g., when compared to the middle portion of the picture). This may indicate that the spherical sampling density of the picture may be uneven. A motion field, which may describe the temporal correlation among neighboring ERP pictures, may become complicated. Certain video codecs (e.g., MPEG-2, H.264, and/or HEVC) may use a translational model to describe the motion field and may not be able to represent shape varying movements in planar ERP pictures.

Geometric projection formats may be used to map a 360-degree video onto multiple faces. For example, a cubemap projection (CMP) may be used. FIG. 2A illustrates an example CMP geometry. As seen in FIG. 2A, the CMP may include six square faces, which may be labeled as PX, PY, PZ, NX, NY, and/or NZ. P may stand for positive, and N may stand for negative. X, Y, and Z may refer to the axes. The faces may be labeled using numbers 0-5. For example. the faces may be labeled as PX (0), NX (1), PY (2), NY (3), PZ (4), NZ (5). If the radius of the tangent sphere is 1, the lateral length of each face may be 2. The six faces of the CMP format may be packed together (e.g., frame-packed together) into a picture (e.g., a single picture). A face may be rotated by a degree (e.g., certain degree), which may affect (e.g., maximize affect) the continuity between neighboring faces. FIG. 26 illustrates an example packing that places six faces into a rectangular picture. A face index may be put in a direction that is aligned with a corresponding rotation of the face. For example, face #3 and #1 may be rotated counter-clockwise by 180 and 270 degrees, respectively. The other faces may not be rotated. In examples, frame packing method may include a 3×2 layout (e.g., as shown in FIG. 2B). As seen in FIG. 2B, a top row of 3 faces may be spatially neighboring faces in a 3D geometry and may have a continuous texture. As seen in FIG. 2B, a bottom row of 3 faces may be spatially neighboring faces in a 3D geometry and may have a continuous texture. The top face row and the bottom face row may not be spatially continuous in the 3D geometry, and a seam, such as a discontinuous boundary, may exist between the two face rows.

In CMP, if the sampling density is 1 at the center of a face, the sampling density may increase towards the edges. The texture around the edges may be stretched when compared to the texture at the center. Cubemap-based projections (e.g., equi-angular cubemap projection (EAC), adjusted cubemap projection (ACP). and/or the like) may adjust a face (e.g., each face) using a non-linear warping function in the vertical and/or horizontal directions. In EAC, for example, adjustments may be performed using a tangent function. In ACP, adjustment may be performed using a second order polynomial function.

Hybrid cubemap projection (HOP) may be performed. In HCP, an adjustment function and its parameters may be tuned for a face and/or a direction individually. A cubemap-based projection format may include a hybrid equi-angular cubemap projection format (HEC). Cube-based projections may be packed. For example, cube-based projections may be packed similar to CMP. Face discontinuity within a frame packed picture may occur in a cube-based projection.

Geometry padding for 360-degree video coding may be performed.

Figure 3A:
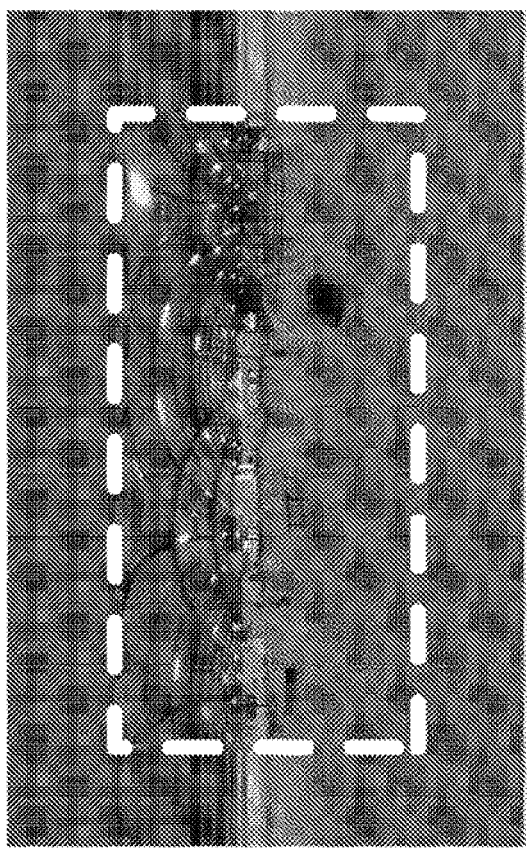
FIG. 3A illustrates an example picture with padded boundaries using equirectangular projection (ERP).

Video codecs may consider a 2D video captured on a plane. If motion compensated prediction uses a sample outside of a reference picture's boundaries, padding may be performed by copying one or more sample values from the picture boundaries. This type of padding may be known as repetitive padding. FIGS. 3A and 38 illustrate examples of extending an original picture (e.g., bounded by the dotted box) using repetitive padding for ERP and CMP, respectively.

A 360-degree video may encompass video information on a sphere (e.g., the whole sphere), and/or may have a cyclic property. A reference picture of the 360-degree video may not have boundaries. For example, the reference picture of the 360-degree video may be wrapped around the sphere (e.g., and may not have boundaries). The cyclic property may exist when representing a 360-degree video on a 2D plane. The cyclic property may exist regardless of which projection format and/or which frame packing implementation is used. Geometry padding may be performed for 360-degree video coding by padding a sample by considering the 3D geometry.

Geometry padding for ERP may be performed. ERP may be defined on a sphere with a longitude and a latitude. Given a point (u, v) to be padded (e.g., outside of the ERP picture), the point (u', v') may be used to derive a padding sample. This may be determined by:

$$\text{if } (u < 0 \text{ or } u \geq W) \text{ and } (0 \leq v < H); u' = u \% W, v' = v \quad (3)$$

$$\text{Otherwise, if } (v < 0); v' = -v - 1, u' = \left(u + \frac{W}{2}\right) \% W; \quad (4)$$

$$\text{Otherwise, if } (v \geq H); v' = 2*H - 1 - v, u' = \left(u + \frac{W}{2}\right) \% W; \quad (5)$$

W and H may be the width and height of an ERP picture.

Figure 4A:
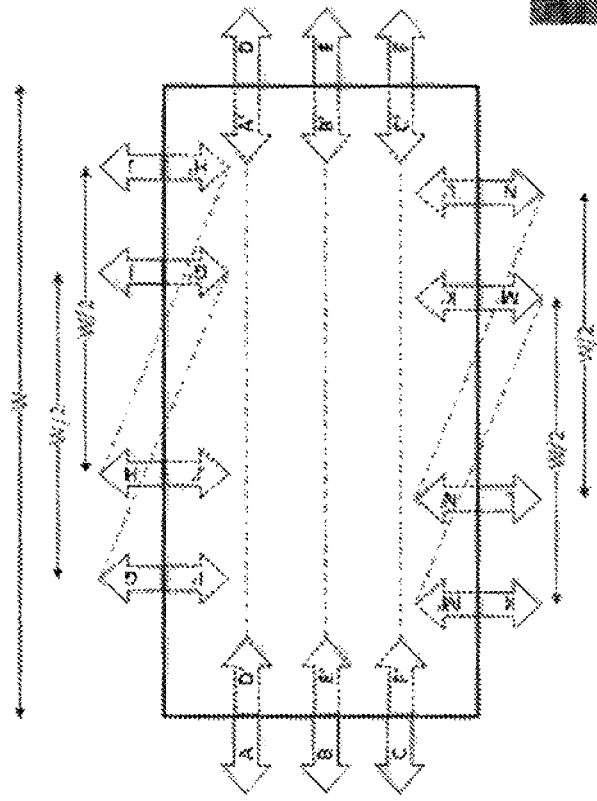
FIG. 4A illustrates an example padding geometry for ERP.
Figure 4B:
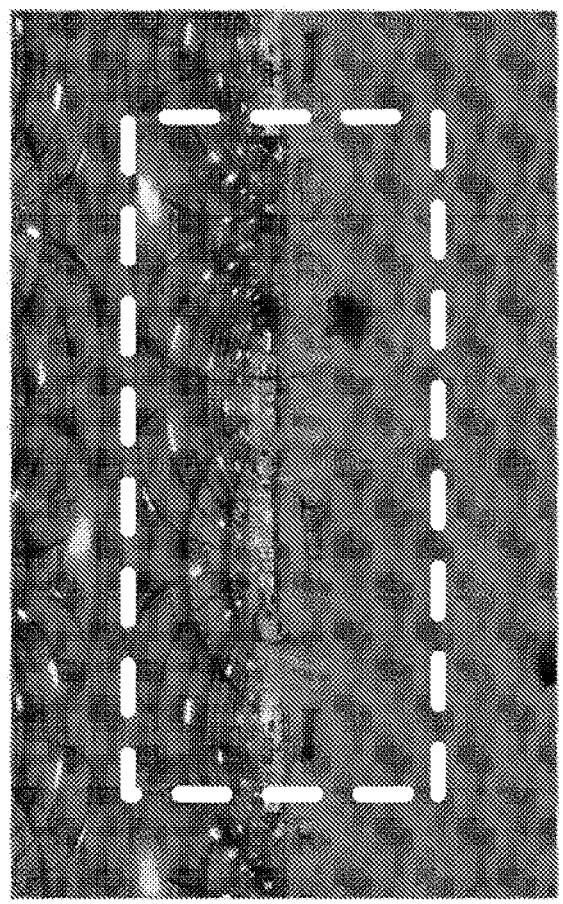

FIG. 4A illustrates an example of geometry padding for ERR Padding may be performed outside of a left boundary of a picture. For example. as seen in FIG. 4A, samples A, B, and C that are located outside of the left boundary of the picture may be padded with samples A', B', and C', which may be located inside the right boundary of the picture. Padding may be performed outside of a right boundary of a picture. For example, as seen in FIG. 4A, samples D, E, and F may be padded with samples D', E', and F', which may be located inside the left boundary of the picture. Padding may be performed outside of a top boundary of a picture. For example, as seen in FIG. 4A, samples G, H, I, and J may be padded with samples G', H', I', and J', which may be located inside the top boundary of the picture with an offset of half the width. Padding may be performed outside of a bottom boundary of a picture. For example, as seen in FIG. 4A, samples K, L, M, and N may be padded with samples K', L', M', and N', which may be located inside the bottom boundary of the picture with an offset of half the width. FIG. 48 shows an example of an extended ERP picture using geometry padding. As seen in FIG. 4B, geometry padding may provide continuity between neighboring samples for areas outside of an ERP picture's boundaries. Geometry padding for ERP may be simplified. For example, the left and/or right boundaries of a picture may be padded using geometry padding, and the top and bottom boundaries of the picture may be padded using repetitive padding. Geometry padding the left and/or right boundaries of a picture and repetitive padding the top and bottom boundaries of the picture may be desirable, e.g., as areas around the equator, such as the left and/or right boundaries, may include more interesting video content and/or may be viewed more frequently by users compared to the pole areas, such as the top and bottom boundaries.

Figure 5A:
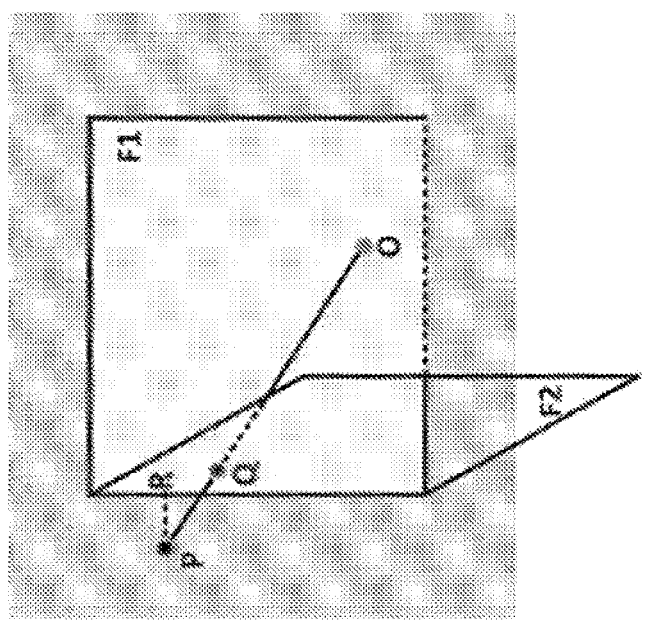
FIG. 5A illustrates an example padding geometry for CMP.
Figure 5B:
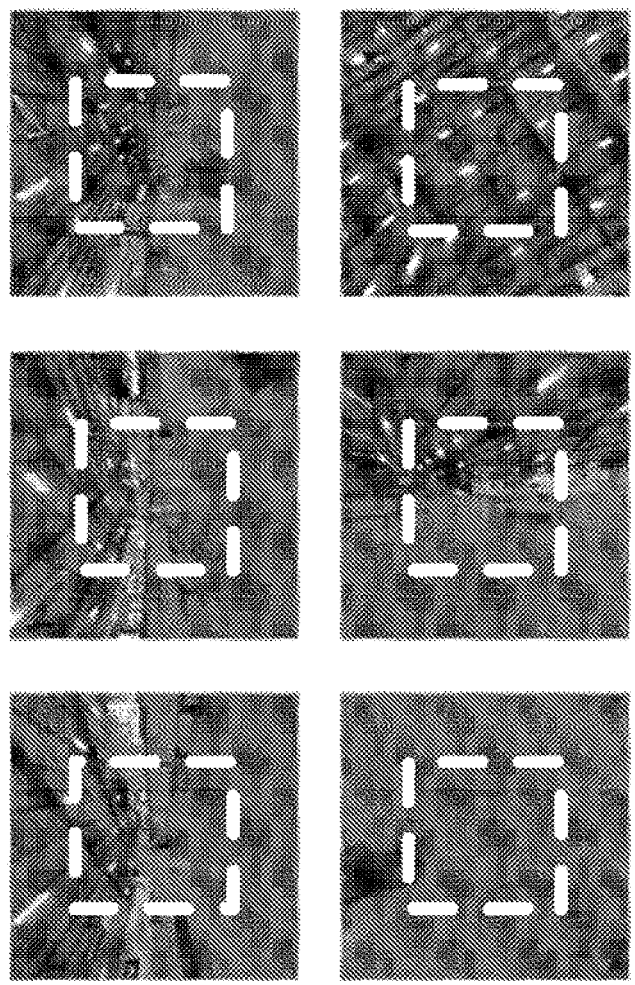
FIG. 5B illustrates example padded CMP faces.

When a coded picture is in CMP format, one or more faces of the CMP may be padded using geometry padding. FIG. 5A illustrates an example of geometry padding performed on a given face in a 3D geometry. As seen in FIG. 5A, a point P may be on face F1 and may be outside of face F1's boundaries. Point P may be padded. As seen in FIG. 5A, point O may be on the center of a sphere. As seen in FIG. 5A, R may be a left boundary point, which may be closest to P and inside face Ft. As seen in FIG. 5A, point O may be the projection point of point P on face F2 from the center point O. Geometry padding may be performed using a sample value at point Q to fill a sample value at point P. FIG. 58 illustrates an example of extended faces using geometry padding for a CMP 3×2 picture. As shown in FIG. 5B, padding may be performed on each face individually. Geometry padding may provide samples for areas outside of a CMP face's boundary.

Figure 6:
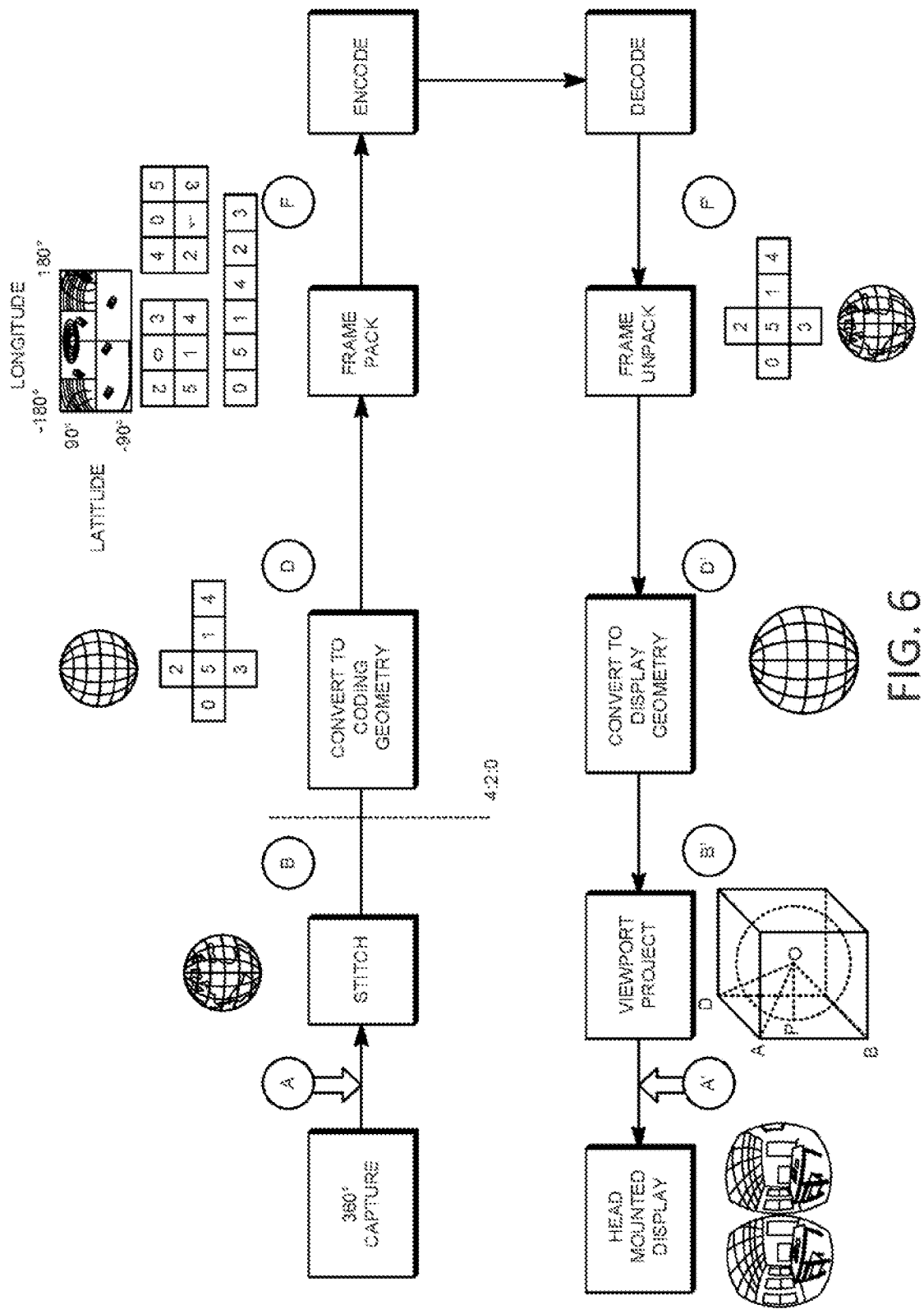
FIG. 6 illustrates an example 360-degree video workflow.

Hybrid video encoding may be performed. An example 360-degree video delivery implementation is illustrated in FIG. 6. As seen in FIG. 6, an exemplary 360-degree video delivery implementation may include a 360-degree video capture, which may use multiple cameras to capture videos covering a sphere space (e.g., whole sphere space). The videos may be stitched together in a native geometry structure. For example, the videos may be stitched together in an ERP format. The native geometry structure may be converted to one or more projection formats for encoding, e.g., based on the video codecs. At the receiver, the video may be decoded, and/or the decompressed video may be converted to the geometry for display. The video may be used for rendering via viewport projection according to users viewing angle.

Figure 7:
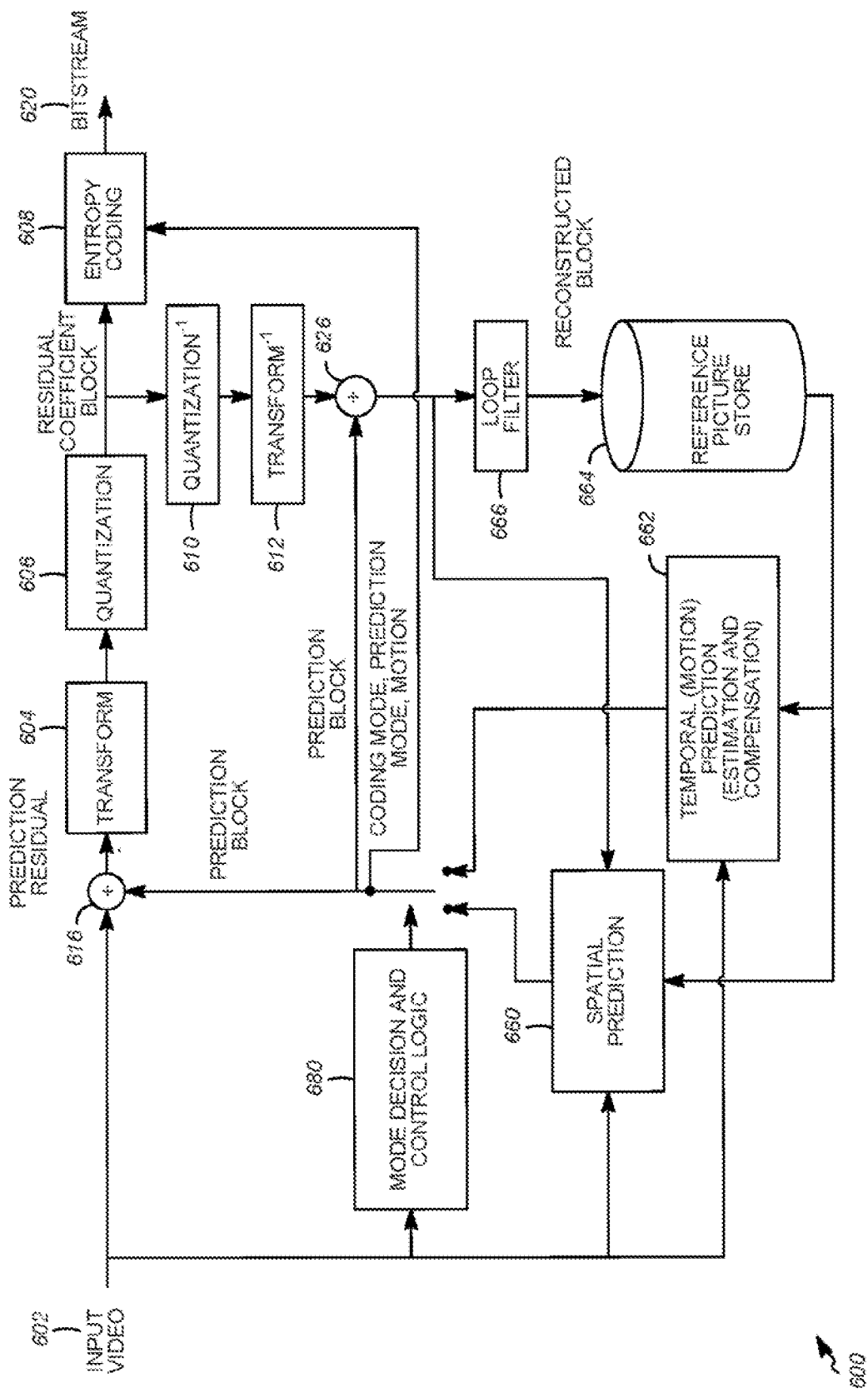
FIG. 7 illustrates an example video encoder.

FIG. 7 illustrates an example block-based hybrid video encoding system 600. The input video signal 602 may be processed block by block. Extended block sizes (e.g., referred to as a coding unit (CU)) may be used (e.g., used in HEVC) to compress high resolution (e.g., 1080p and/or beyond) video signals. A CU may have up to 64×64 pixels (e.g., in HEVC). A CU may be partitioned into prediction units (PUs), for which separate predictions may be applied. For an input video block (e.g., a macroblock (MB) or CU), spatial prediction 660 or motion prediction 662 may be performed. Spatial prediction (e.g., or intra prediction) may use pixels from already coded neighboring blocks in the same video picture and/or slice to predict a current video block. Spatial prediction may reduce spatial redundancy inherent in the video signal. Motion prediction (e.g., referred to as inter prediction or temporal prediction) may use pixels from already coded video pictures to predict a current video block. Motion prediction may reduce temporal redundancy inherent in the video signal. A motion prediction signal for a given video block may be signaled by a motion vector that indicates the amount and/or direction of motion between the current block and its reference block. If multiple reference pictures are supported (e.g., in H.264/AVC, HEVC, and/or the like), the reference picture index of a video block may be signaled to a decoder. The reference index may be used to identify from which reference picture in a reference picture store 664 the temporal prediction signal may come.

After spatial and/or motion prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or intra coding mode), prediction mode information, motion information, and/or quantized residual coefficients may be sent to an entropy coding unit 608 to be compressed and packed to form the bit-stream 620.

Figure 8:
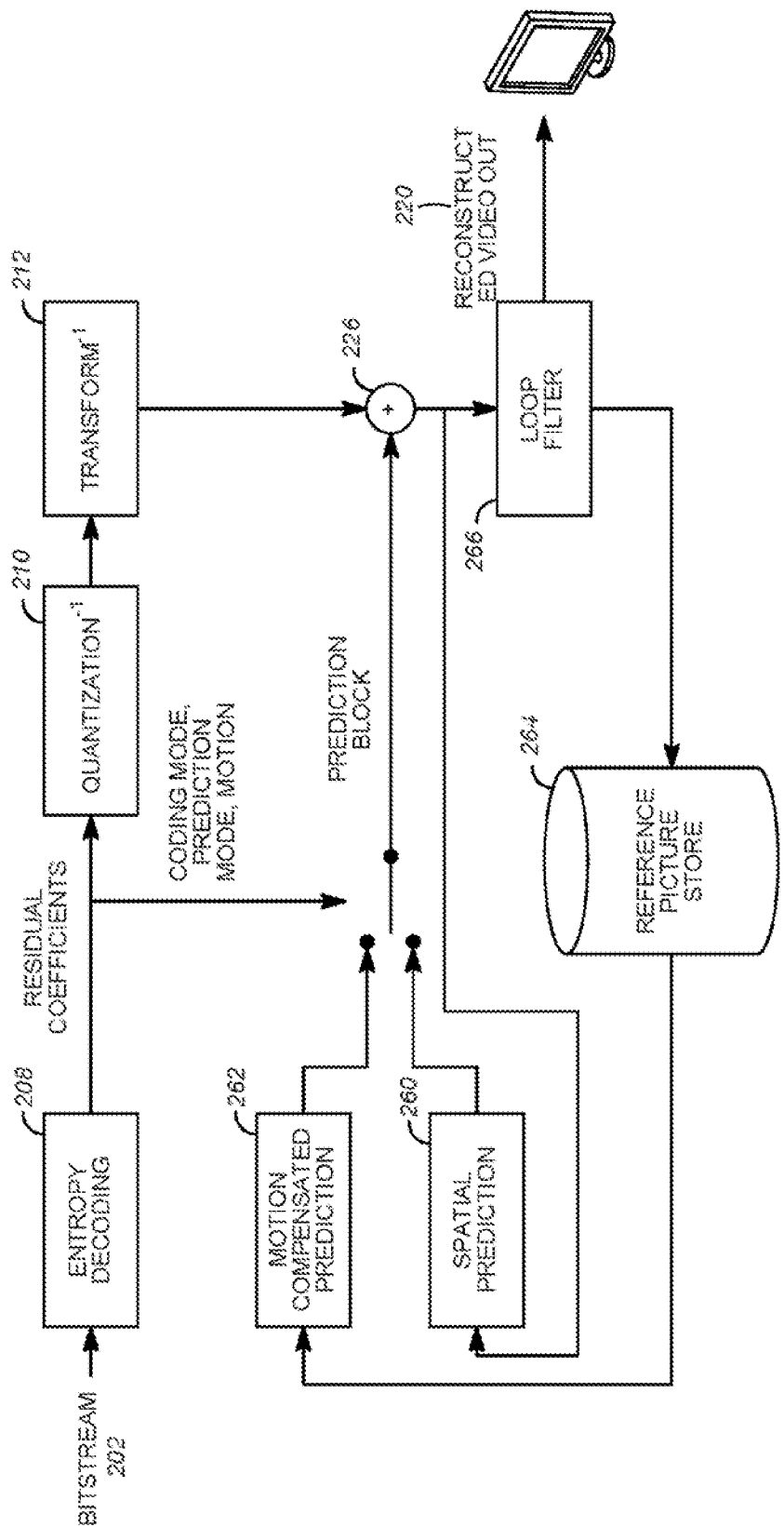
FIG. 8 illustrates an example video decoder.

FIG. 8 illustrates an example block-based video decoder. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

Figure 9:
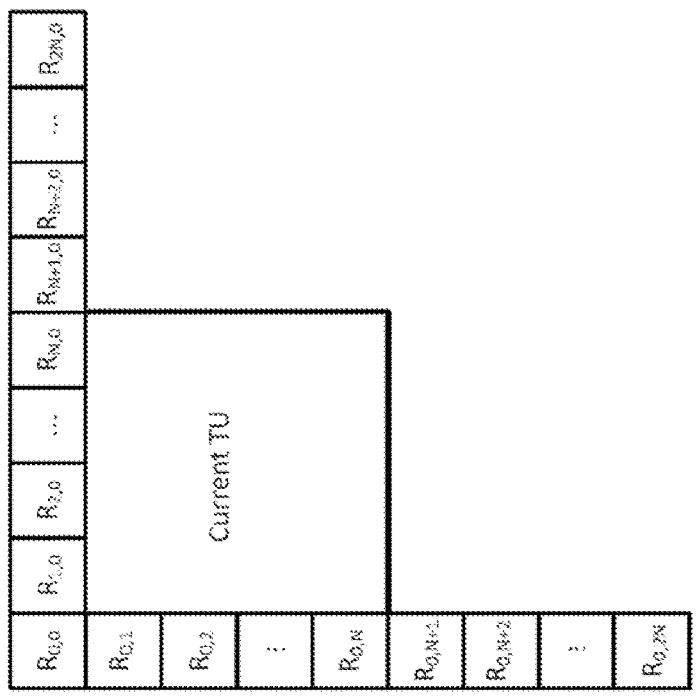
FIG. 9 illustrates an example reference sample used in intra prediction.

A video codec, such as H.264 and/or HEVC, may be used to code a 2D planar rectilinear video. Video coding may exploit spatial and/or temporal correlation, e.g., to remove information redundancies. One or more prediction techniques, such as intra prediction and/or inter prediction, may be applied during video coding. Intra prediction may predict a sample value with its neighboring reconstructed samples. FIG. 9 shows example reference samples that may be used to intra-predict a current transform unit (TU). The reference samples may be or may include reconstructed samples located above and/or to the left of the current TU. The reference samples may be or may include from left and/or top neighboring reconstructed samples.

Figure 10:
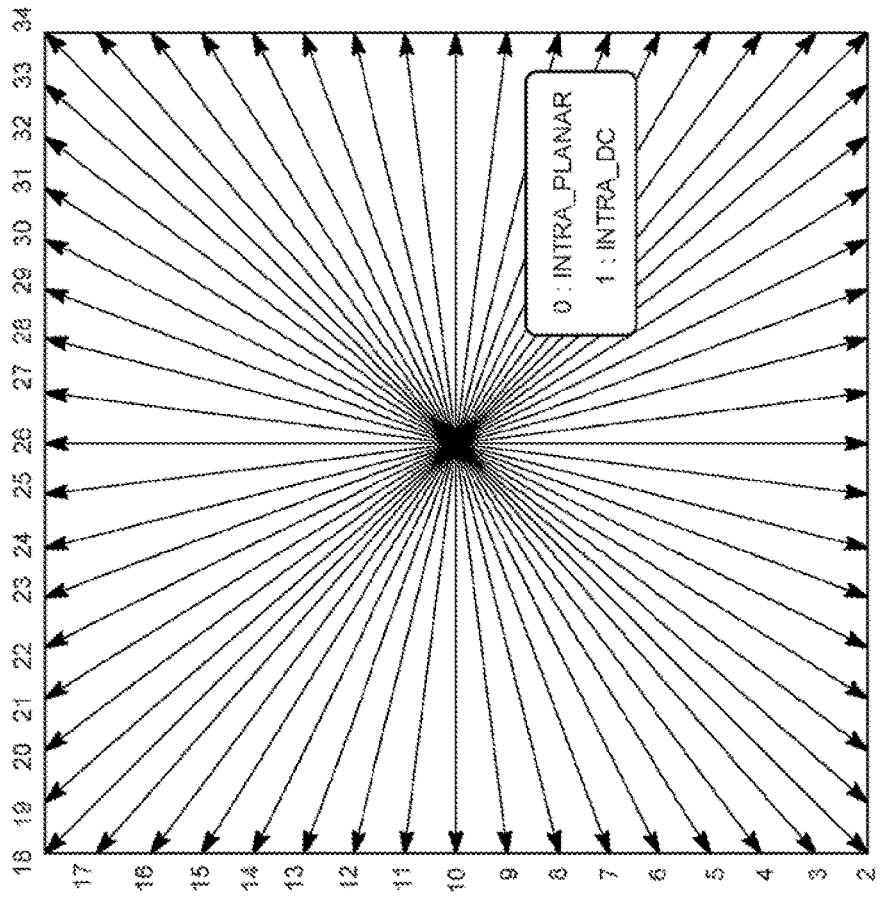
FIG. 10 illustrates an example indication of intra prediction directions.

FIG. 10 illustrates an example indication of intra prediction directions in HEVC. For example, HEVC may specify 35 intra prediction modes that include planar (0), DC (1), and/or angular predictions (2-34), as shown in FIG. 10. An appropriate intra prediction mode may be selected. For example, an appropriate intra prediction mode may be selected at the encoder side. Predictions generated by multiple candidate intra prediction modes may be compared. The candidate intra prediction mode that produces the smallest distortion between prediction samples and original samples may be selected. The selected intra prediction mode may be coded into a bitstream.

Figure 11:
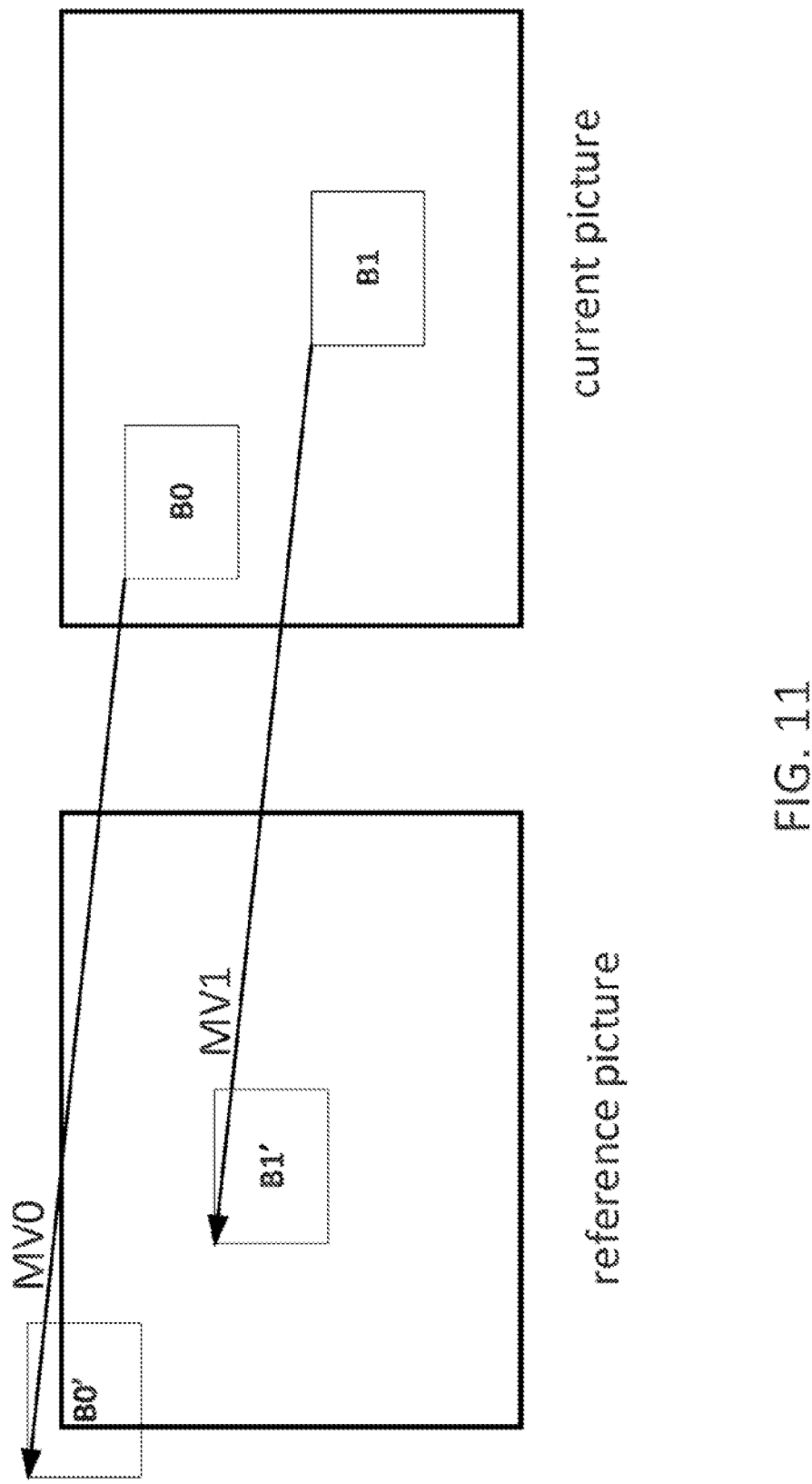
FIG. 11 illustrates an example of inter prediction with a motion vector (e.g, uni-prediction).
Figure 12:
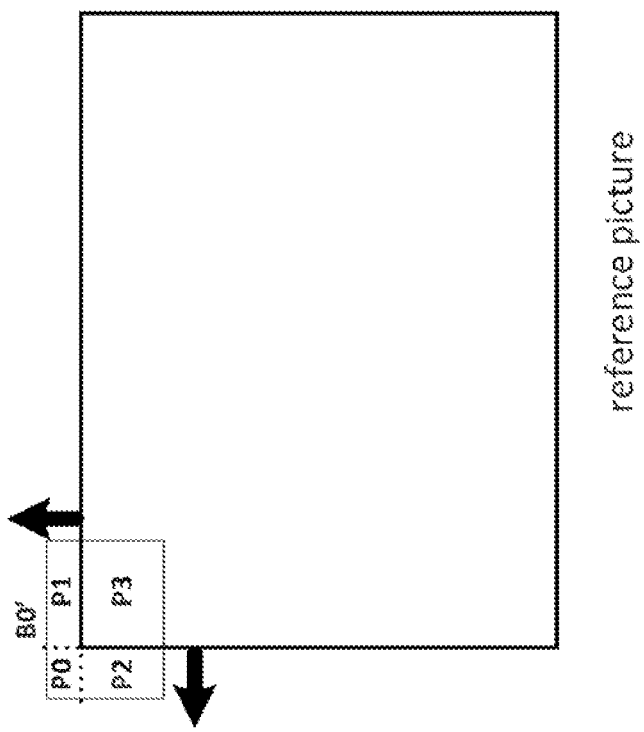
FIG. 12 illustrates an example padding for reference samples outside a picture boundary.

Angular predictions may be used to predict directional textures. FIG. 11 shows an example inter prediction with a motion vector (MV). Blocks B0' and B1' in a reference picture may be respective reference blocks for blocks B0 and B1 of a current picture. Reference block B0' may be partially outside the boundary of the reference picture. Padding may be used to fill unknown samples outside picture boundaries. FIG. 12 shows an example padding for reference samples outside the picture boundary. For example. the padding examples for block B0' may have four parts P0, P1, P2, and P3. Parts P0, P1, and P2 may be outside the picture boundary and may be filled, for example, via padding. Part P0 may be filled with a top-left sample of the reference picture. Part P1 may be filled with vertical padding using a top-most row of the reference picture. Part P2 may be filled with horizontal padding using a left-most column of the picture.

Figure 13:
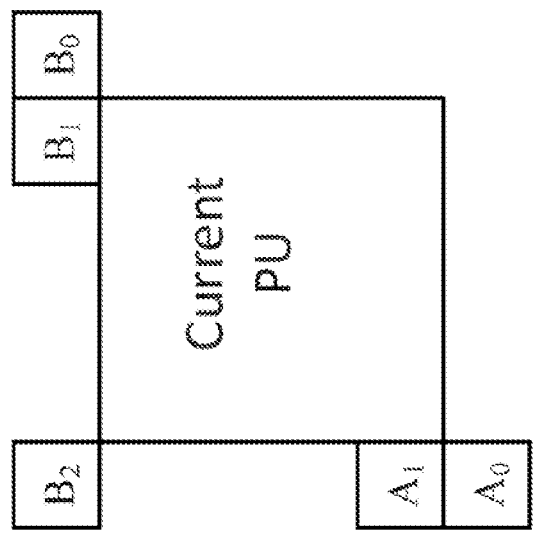
FIG. 13 illustrates an example spatial neighbors used in determining spatial merge candidates.

A merge mode may use (e.g., reuse) the MV information of spatial and/or temporally neighboring PUs. The motion vectors for a PU (e.g., a current PU) may not be coded. An encoder and/or a decoder may form a motion vector merge candidate list. For example, the list may be created using the MV information of spatial and/or temporally neighboring PUs. FIG. 13 illustrates an example of the spatial neighbors (e.g., bottom left left, top right, top, and/or top left) used for merge candidate derivation. A selected merge candidate index may be coded and/or signaled. A merge candidate list may be constructed by the decoder. The list construction by the decoder may be similar to (e.g., the same as) the list construction by the encoder. The entry of the signaled merge candidate index may be used as the MV of a PU (e.g., current PU).

Geometry padding for 360-degree video coding may be implemented. For example, geometry padding for 360-degree video coding may be implemented based on 2D to 3D and 3D to 2D mapping functions. The 2D to 3D and 3D to 2D mapping functions may use division and/or trigonometric functions, such as sine, cosine, tangent, and/or the like. The implementation of geometry padding may utilize computing resources, such as a CPU and/or memory. The geometry padding may be hardware implemented. Divisions with constant denominator may be implemented. For example, divisions with constant denominator may be implemented using bit shift operations. Divisions with variable denominator may be difficult to implement One or more functions may be implemented using look-up tables (LUTs). LUTs may not be available for a decoding platform. An encoder and/or a decoder may store the LUTs in memory.

Geometry padding may be implemented by creating a reference picture. A number of samples in the reference picture may be pre-padded around the picture boundaries. One or more pre-padded samples may not be used. For example, one or more pre-padded samples may be omitted and may not be used when no motion vectors in a bitstream refer to the padded samples. The reference picture and/or the pre-padded samples may be stored. For example, the reference picture and/or the pre-padded samples may be stored in a memory.

In examples, geometry padding may be implemented based on deriving one or more samples when fetching spherical neighbors, e.g., as described herein. For example, one or more samples may be derived from a single face-based projection geometry, such as ERP, EAP, AEP, and/or the like formats, when horizontal geometry padding is used. The clipping operation may be used to constrain the sample within the decoded picture.

In examples, a block may be split into one or more sub-blocks. For example, a block may be split into one or more sub-blocks based on its motion vectors. Prediction for a sub-block from different parts of the projected video may be fetched. For example, if a motion vector takes the left part of a block outside the left edge of an ERP picture, the block may be split into multiple parts, such as two parts. The parts may be inside or and/or outside of the edge of the ERP picture. The part that is outside of the left edge may be fetched from the right side of the ERP picture, and the part that is inside the left edge may be fetched from the left side of the ERP picture.

A video coding device may perform geometry padding. A video coding device described herein may be or may include an encoder and/or a decoder. For example, a video coding device may perform geometry padding based on deriving one or more samples when fetching one or more spherical neighbors.

An indication may be signaled to enable geometry padding, such as horizontal geometry padding. For example, a wraparound enabled indication may be signaled to indicate that geometry padding is enabled. The wraparound enabled indication may indicate whether a horizontal wraparound motion compensation is enabled. The wraparound enabled indication may be or may include a wraparound enabled flag that may indicate whether the horizontal wraparound motion compensation is enabled. The indication, such as the wraparound enabled indication, may be signaled in a bitstream.

The correct position of one or more spherical neighbors may be determined. For example, the video coding device may determine the correct position of the one or more spherical neighbors associated with a current sample based on a reference sample wraparound offset of the current sample. The video coding device may account for the offset, such as the reference sample wraparound offset, via geometry padding and may compute the correct position of the one or more spherical neighbors. For example, the reference sample wraparound offset may be or may include information that is indicative of a face width of the picture, such as a frame-packed picture associated with the video content. The video coding device may compute the correct position of one or more spherical neighbors based on a size indication indicative of a face width of the frame-packed picture. The size indication may be or may include guard band size, such as a width of a guard band in luma samples. Based on the size indication that may be or may include the width of the guard band size, the video coding device may compute the correct position of one or more spherical neighbors associated with a current sample. The position and/or size of guard bands may be added (e.g., may have been added) when packing one or more faces within a picture. The guard bands may have been added when packing one or more faces within the picture, such as the frame-packed picture. For example, the guard bands may have been added when packing one or more faces within the picture before encoding. As described herein, one or more indications related to geometry padding may be signaled to indicate whether geometry padding, such as horizontal geometry padding, is applied and/or specify guard bands.

For projection geometries that include a face, such as a single face projection format like ERR EAP, AEP, and/or the like projection formats, the geometry padding may be performed in the horizontal direction. When geometry padding is performed in the horizontal direction, repetitive padding may be used in the vertical direction. A sample position may be determined as a horizontal sample coordinate may be wrapped within a coded picture (e.g., see Eq. (3)). A vertical sample coordinate may be clipped to one or more coded picture boundaries, such as in repetitive padding. The integer sample derivation process and/or fractional sample interpolation process for inter prediction (e.g., using horizontal geometry padding) for a face (e.g., single face) based projection geometries may be described.

One or more indications related to for geometry padding may be signaled. As described herein, a wraparound enabled indication may be signaled. The wraparound enabled indication may indicate whether a horizontal wraparound motion compensation is enabled. The wraparound enabled indication may be signaled at a sequence and/or picture level. For example, a wraparound enabled indication that indicates geometry padding may be signaled at a sequence level, such as a sequence parameter set (SPS).

One or more frame packing parameters may be signaled in a bitstream. For example, one or more frame packing parameters may be signaled at sequence and/or picture level using the high level syntax (HLS) elements. The position and/or orientation of a face a frame packed picture may be signaled in a bitstream. An indication indicative of a face width that is associated with a frame packed picture may be signaled in a bitstream. An indication for one or more offsets, such a size indication indicative of a width of guard band and/or presence of one or more guard bands. may be signaled in a bitstream. For example, the size indication and/or the presence of the guard band for one or more pixels (e.g., additional pixels) at face edges may be signaled in the bitstream. The position of guard bands, such as the offsets, may be based on the projection format. For example, for the single face-based projection geometries, the guard bands may be located at the left and/or right face boundaries. In examples, the size of the guard bands located at the left and right face boundaries may be the same. In examples, the size of the guard bands located at the left and right face boundaries may differ. The size indication that indicates a width of guard band may include widths of the guard bands, such as the left and the right guard bands. For the multi face-based projection format, such as the CMP format, the guard bands may be located around a group of continuous faces and/or a face row. If the sizes of the guard bands differ in the multi face-based projection format, the size indication may include widths of each guard band.

One or more guard bands and/or geometry padding syntax elements described herein may be signaled. For example. a wraparound enabled indication may be signaled to indicate whether a horizontal wraparound motion compensation is enabled. The indication may be or may include a wraparound enabled flag. The indication may include a size indication indicative of a face width of the frame-packed picture may be signaled. As described herein, the size indication (e.g., indicative of a face width) may be or may include a parameter, such as guard_bands_param_present_flag, to indicate a width of the guard band. Table 1 illustrates an example of geometry padding and guard band syntax elements. The geometry padding and/or guard band syntax elements may be signaled at sequence level and/or at picture level.

TABLE 1

Geometry padding and guard bands syntax

| | Descriptor |
|---|---|
| 360_format( ) { | |
|   projection_geometry | ue(v) |
|   guard_bands_param_present_flag | u(1) |
|   if( guard_bands_param_present_flag ) | |
|     guard_bands_size_in_luma_samples | ue(v) |
|   geometry_padding_enabled_flag | u(1) |
| } | |

In examples, the parameters of Table 1 may have the following semantics.

A syntax element projection_geometry may be or may include a mapping index (e.g., shown in Table 2) of the used projection geometry.

A syntax element guartbands_param_present_flag may indicate if a syntax element guard_bands_size_in_luma_samples is present. If the syntax element guard_bands_size_in_luma_samples is not present, the value of the syntax element guard_bands_param_present_flag may be inferred to be equal to 0.

An offset present indication, such as an indication indicating whether an offset is present, may include information about offset. For example, the offset present indication, such as guard_bands_param_present_flag, may be used to determine if an offset is present in a bitstream. If the offset present indication indicates that the offset is present in the bitstream, a video coding device, such as a decoder, may parse the bitstream to receive the offset. If the offset present indication indicates that the offset is absent in the bitstream, a video coding device may skip parsing the bitstream to receive the offset. For example, if the offset present indication, such as guard_bands_param_presnt_flag, indicates that the offset is absent, the video coding device may skip using the guard band. The leftmost and the rightmost boundaries of the projected face may be connected in a sphere, and the boundaries may not be connected in the frame packed picture. The filled/extended samples in the guard band may be coded in the bitstream. For example, the left guard band information may be from the rightmost region inside the face, and the right guard band information may be from the leftmost region inside the face. The reconstructed samples at the leftmost and rightmost boundaries may be continuous (e.g., as the reconstructed samples at the leftmost and the rightmost boundaries are treated as the neighboring samples in coding). The samples in the guard band may be discarded in the rendering (e.g., as the samples do not exist physically).

A size indication indicative of a face width of a picture (e.g., a frame-packed picture) may be received. For example, the size indication may include a syntax element, such as guard_bands_size_in_luma_samples. The face width of the frame-packed picture may be calculated based on the size indication. The calculated face width may be used as the reference sample wraparound offset. For example, the syntax element guard_bands_size_in_luma_samples may represent a size in one or more luma samples of the guard bands used in the frame packed picture. The location of guard bands (e.g., offsets) may be defined for a projection format. For example, for a single face-based projection geometry, such as the ERP, the EAP, the AEP and/or the like formats, one or more guard bands may be defined at the left and/or right face boundaries. In examples, the guard bands at the left and the right face boundaries may have the same width. In examples, the guard bands at the left and the right face boundaries may have different widths. For a multi face-based projection geometry, such as the CMP format, one or more guard bands may be defined around a group of faces (e.g., each group of continuous faces or each face row). The syntax element guard_bands_size_in_luma_samples may not be equal to 0. The syntax element guard_bands_size_in_luma_samples may be an integer multiple of MinCbSizeY.

If the syntax element geometry_padding_enabled_flag is equal to 1, the syntax element geometry_padding_enabled_flag may indicate that the geometry padding of reference pictures is applied for one or more samples located outside of the picture boundary. If the syntax element geometry_padding_enabled_flag is equal to 0, the syntax element geometry_padding_enabled_flag may indicate that the geometry padding is skipped (e.g., not applied). If the syntax element geometry_padding_enabled_flag is not present, the value of the syntax element geometry_padding_enabled_flag may be inferred to be equal to 0.

Table 2 illustrates examples projection geometry indices.

TABLE 2

Projection geometry indices

| Index | Projection geometry |
|---|---|
| 0 | Equirectangular |
| 1 | Cubemap |
| 2 | Equal-area |
| 3 | Adjusted equal-area |

An actual size of a face, such as a face width without the guard bands, may be computed from the information signaled in Table 1 and/or a coded picture size. For example, for a single face-based projection geometry, such as the ERP, the EAP, the AEP, and/or the like formats, with guard bands on the left and/or right sides of the coded picture, the actual face width may be calculated, e.g., using Eq. (6). A parameter, such as the size indication, that indicates the face width of the frame-packed picture may be or may include pic_width_in_luma_samples as described herein. The size indication or the parameter such as the pic_width_in_luma_samples may represent the width of a decoded picture in units of luma samples. The parameter pic_width_in_luma_samples may be signaled at the sequence level. The face height may be inferred from the coded picture height, e.g., in the absence of guard bands on the top and/or bottom sides.

$$\text{face\_width\_in\_luma\_samples} = \text{pic\_width\_in\_luma\_samples} - 2*\text{guard\_bands\_size\_in\_luma\_samples} \quad (6)$$

In examples, the left and right guard bands may have the same size. in examples, the left and right guard bands may have different sizes. If the left and right guard bands have different sizes, a size (e.g., an individual size) of a guard band may be signaled, e.g., according to Table 3. Table 3 illustrates an example geometry padding and guard bands syntax.

TABLE 3

Geometry padding and guard bands syntax

| | Descriptor |
|---|---|
| 360_format( ) { | |
|   projection_geometry | ue(v) |
|   guard_bands_param_present_flag | u(1) |
|   if( guard_bands_param_present_flag ) { | |

TABLE 3-continued

Geometry padding and guard bands syntax

| | Descriptor |
|---|---|
| if( projection_geometry = = 0 \|\| | |
| projection_geometry = = 2 \|\| | |
| projection_geometry = = 3 ) { | |
|    left_guard_band_width_in_luma_samples | ue(v) |
|    right_guard_band_width_in_luma_samples | ue(v) |
| } else { | |
|    guard_bands_size_in_luma_samples | ue(v) |
|    } | |
| } | |
| geometry_padding_enabled_flag | u(1) |
| } | |

A syntax element guard_bands_param_present_flag may represent whether at least one of the syntax elements left_guard_band_width_in_luma_samples. right_guard_band_width_in_luma_samples, or guard_bands_size_in_luma_samples is present. If the at least one of the syntax elements, such as left_guard_band_width_in_luma_samples, right_guard_band_width_in_luma_samples, or guard_bands_size_in_luma_samples is not present, the value of the syntax element guard_bands_param_present_flag may be inferred to be equal to 0.

A syntax element left_guard_band_width_in_luma_samples may represent the width in luma samples of the guard band used in the frame packed picture at the left face boundary of a picture associated with a single face-based projection (e.g., ERP, EAP, and/or AEP picture). The syntax element left_guard_band_width_in_luma_samples may be an integer multiple of MinCbSizeY.

A syntax element right_guard_band_width_in_luma_samples may represent the width in luma samples of the guard band used in the frame packed picture at the right face boundary a picture associated with a single faced-based projection (e.g., ERP, EAP, and/or AEP picture). The syntax element right_guard_band_width_in_luma_samples may be an integer multiple of MinCbSizeY.

As described herein, the face width of the frame-packed picture may be calculated based on the size indication that indicates the face width of the frame-packed picture, such as the left_guard_band_width_in_luma_samples and/or the right_guard_band_width_in_luma_samples. For example, using the representation described herein, the face width may be calculated. e.g., based on using Eq. (7).

face_width_in_luma_samples=pic_width_in_luma_samples−
(left_guard_band_width_in_luma_samples+
right_guard_band_width_in_luma_samples)    (7)

In examples, the values of guard band width may be multiple of MinCbSizeY. If the values of guard band width are multiple of MinCbSizeY, the syntax elements may be specified in units of MinCbSizeY, e.g., instead of or in addition to in units of luma samples.

A single face-based projection geometry may be geometry padded based on one or more samples. In inter prediction, a current block in a current picture may be predicted from a reference block in a reference picture. For example. the current block in the current picture may be predicted from the reference block in the reference picture using a MV corresponding to a translation from the current block position to the reference block position. For a sample position (x,y) within the current block, a prediction signal $I_{pred}(x,y)$ may be obtained from the reference picture $I_{ref}$ and MV $(\Delta x, \Delta y)$, e.g., using Eq. (8).

$$I^{pred}(x,y) = I^{ref}(x+\Delta x, y+\Delta y) \qquad (8)$$

The MV may use fractional precision p. For example, the MV may use ½, ¼, ⅛, or 1/16-pixel precision. The fractional precision may use interpolation from one or more available integer sample positions. A sample position in a reference picture may be represented as an integer part and a fractional part, e.g., using Eqs. (9)-(12). $s=-\log_2(p)$, >>, and << may represent the arithmetic right and left shifts, respectively. & may represent a bit-wise "and" operator.

$$x_{Int} = x + (\Delta x >> s) \qquad (9)$$

$$x_{Frac} = \Delta x \& [(1<<s)-1] \qquad (10)$$

$$y_{Int} = y + (\Delta y >> s) \qquad (11)$$

$$y_{Frac} = \Delta y \& [(1<<s)-1] \qquad (12)$$

The prediction signal may be obtained by interpolating one or more neighboring samples at integer positions. The prediction signal may be obtained to determine the value at a fractional position. If a sample at integer position $(x_{Int}, y_{Int})$ is outside of a reference picture boundary, such as outside of the frame-packed picture, clipping may be used to constrain the sample position to be within the coded picture boundary. This may be similar (e.g., equivalent) to performing repetitive padding. For luma samples, the $x_{Int}$ and $y_{Int}$ coordinates may be clipped, e.g., using Eqs. (13) and (14), respectively.

$$\tilde{x}_I^{\cdot} = \begin{cases} 0, & x_L < 0 \\ \text{pic\_width\_in\_luma\_samples} - 1, & x_L > \text{pic\_width\_in\_luma\_samples} - 1 \\ x_L, & \text{otherwise} \end{cases} \qquad (13)$$

$$\tilde{y}_I^{\cdot} = \begin{cases} 0, & y_L < 0 \\ \text{pic\_height\_in\_luma\_samples} - 1, & y_L > \text{pic\_height\_in\_luma\_samples} - 1 \\ y_L, & \text{otherwise} \end{cases} \qquad (14)$$

For example, if the wraparound enabled indication indicates that the horizontal wraparound motion compensation is disabled, clipping and/or repetitive padding may be performed. The current sample location in the frame-packed picture may be identified. The video coding device may determine whether the current sample location is located at a horizontal boundary of the frame-packed picture. The video coding device may determine whether the reference sample location is located outside of the horizontal boundary of the frame-packed picture. The reference sample location on the horizontal boundary of the frame-packed picture may be identified. For example, as described herein, the reference sample location on the horizontal boundary of the frame-packed picture may be identified based on clipping. The current sample may be predicted based on the reference sample location.

For the luma component, when horizontal geometry padding is used, the $x_{int}$ coordinate may be wrapped to the coded picture, e.g., using Eq. (15), where $W_L$=pic_width_in_luma_samples, $F_L$=face_width_in_luma_samples, and $\mod(x, n) = x - n\lfloor x/n \rfloor$, to consider the cyclic property of 360-degree video. As described herein, the indication, such as a wraparound enabled indication, may provide information that the horizontal geometry padding is used.

$$\tilde{x}_L = \begin{cases} \mod(x_L, F_L), x_L < 0 \\ \mod(x_L - W_L, F_L) + W_L - F_L, x_L > W_L - 1 \\ x_L, \text{otherwise} \end{cases} \quad (15)$$

As described herein, the video coding device may determine whether an original reference sample location (e.g., a raw reference sample location) is outside of the frame-packed picture. If the original reference sample location is outside of the frame-packed picture, the reference sample location may be calculated by applying the reference sample wraparound offset to a horizontal sample coordinate associated with the original reference sample location.

In examples, a face width of the frame-packed picture may be determined based on the reference sample wraparound offset. The current sample location may be identified in the frame-packed picture. The video coding device may determine whether an original reference sample location (e.g., a raw reference sample location) is outside of the frame-packed picture. If the original reference sample location is outside of a leftmost horizontal boundary of the frame-packed picture, the reference sample location may be determined by adding the reference sample wraparound offset to a horizontal sample coordinate (e.g., the $x_{Int}$ coordinate) associated with the original reference sample location (e.g., as shown in equation 15). If the original reference sample location is outside of a rightmost horizontal boundary of the frame-packed picture, the reference sample location may be determined by subtracting the reference sample wraparound offset from the horizontal sample coordinate associated with the original reference sample location (e.g., as shown in equation 15).

For a single face-based projection geometry (e.g., ERP, EAP, AEP, and/or the like formats). a luma sample position may be derived, e.g., as shown in Table 4. Table 4 illustrates an example approach to derive a luma sample position. For example, Table 4 illustrates an example for integer sample derivation process and/or fractional sample interpolation process for inter prediction.

TABLE 4

An example approach to derive a luma sample position if geometry_padding_enabled_flag = 1
   wrap $x_L$ using Eq. (15)
   clip $y_L$ using Eq. (14)
else
   clip $x_L$ using Eq. (13)
   clip $y_L$ using Eq. (14)
end For one or more chroma samples, when repetitive padding is used, the $x_{int}$ and $y_{int}$ coordinates may be clipped. e.g., using Eqs. (16) and (17), respectively.

For the chroma component, when horizontal geometry padding is used, the $x_{int}$ coordinate may be wrapped to the coded picture, e.g., using Eq. (18), where $W_C$=pic_width_in_luma_samples/SubWidthC and $F_C$=face_width_in_luma_samples/SubWidthC, to consider the cyclic property of 360-degree video.

$$\tilde{x}_C = \begin{cases} \mod(x_C, F_C), x_C < 0 \\ \mod(x_C - W_C, F_C) + W_C - F_C, x_C > W_C - 1. \\ x_C, \text{otherwise} \end{cases}$$

For a single face-based projection geometry (e.g., ERP, EAP, AEP, and/or the like formats). a chroma sample position may be derived, e.g., as shown in Table 5. Table 5 illustrates an example approach to derive a chroma sample position. For example, Table 5 illustrates an example for integer sample derivation process and/or fractional sample interpolation process for inter prediction.

TABLE 5

An example approach to derive a chroma sample position if geometry_padding_enabled_flag = 1
   wrap $x_C$ using Eq. (18)
   clip $y_C$ using Eq. (17)
else
   clip $x_C$ using Eq. (16)
   clip $y_C$ using Eq. (17)
end The wrap-around of sample locations, described herein using a modulo operation, may apply to a horizontal geometry padding, if the project format used to represent the 360-degree video is a single-faced projection format (e.g., ERP, EAP, AEP, and/or the like projection format). For other projection formats, such as a multi-face projection format (e.g., CMP and/or CMP-based projection format), 2D to 3D and 3D to 2D mapping functions may be implemented. The modulo operation described herein may be applied to the multi-face projection format (e.g., CMP and/or CMP-based projection format) as an approximation.

A video coding device may determine a position for a sample position within the current CU and/or may perform motion compensation at the sample level. For a standard dynamic range (SDR) video and/or the like, the motion compensation may be performed at a block level (e.g., a block may be a CU or a sub-CU). The CU may be split into multiple parts (e.g., two parts) and/or may perform motion compensation using geometry padding for each of the multiple parts (e.g., two parts).

Figure 14:
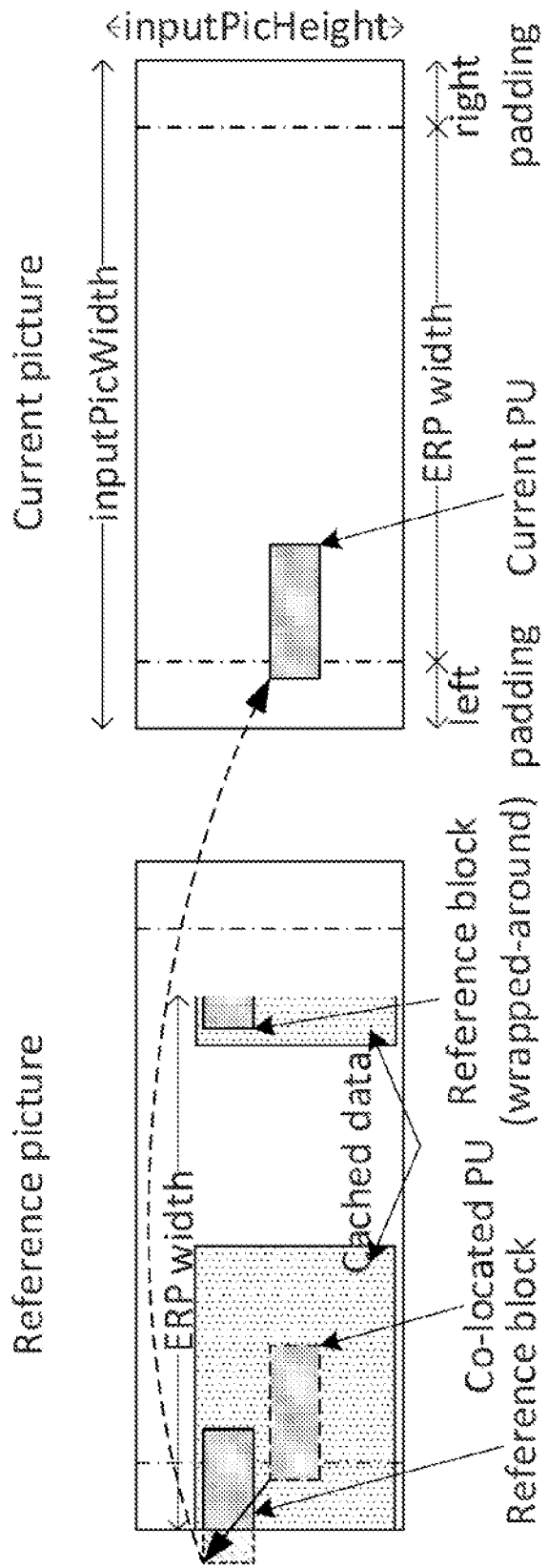
FIG. 14 illustrates an example caching of reconstructed samples for inter prediction when using horizontal geometry padding.

FIG. 14 illustrates an example caching of reconstructed samples for inter prediction when using horizontal geometry padding. In inter prediction. a sample in a reference picture may be accessed more than one time because the same area may be referenced by several blocks, interpolation processes, and/or refinement processes. When accessing the $$\tilde{x}_C = \begin{cases} 0, x_C < 0 \\ (\text{pic\_width\_in\_luma\_samples}/SubWidthC) - 1, x_C > (\text{pic\_width\_in\_luma\_samples}/SubWidthC) - 1 \\ x_C, \text{otherwise} \end{cases} \quad (16)$$

$$\tilde{y}_C = \begin{cases} 0, y_C < 0 \\ (\text{pic\_height\_in\_luma\_samples}/SubWidthC) - 1, y_C > (\text{pic\_height\_in\_luma\_samples}/SubWidthC) - 1 \\ y_C, \text{otherwise} \end{cases} \quad (17)$$

decoded picture buffer, part of a reference picture may be cached in memory (e.g., local memory) for fast read access when performing inter prediction as shown in FIG. 14. The cached area may be a neighborhood centered around a current block position and/or current CTU position. The size of the cached area may be limited. If geometry padding is used and the current block is at and/or near a first face boundary of a first face. the cached area may be split into two sub-areas: a first sub-area located around the current block position in the first face; and a second sub-area located on the other side of the first face boundary, e.g., on a second face, neighboring of the first face. For example, considering an ERP picture as depicted in FIG. 12, in a reference picture, the cached data may include two sub-areas: a first area located around the current block position (e.g., for prediction of two sub-parts P1 and P3 regions in FIG. 12): and a second area (e.g., for prediction of two sub-parts P0 and P2 regions in FIG. 12) corresponding to the wrapped-around data, e.g., that considers a cyclic property of 360-degree video.

To predict the portion that corresponds to P1 and P3 regions shown in FIG. 12, one or more prediction samples may come from the left side of the picture. If the motion vector is of fractional sample precision, interpolation may be implemented and/or may adjust neighbors to come from the right side of the picture (e.g., areas corresponding to P0 and P2 regions shown in FIG. 12). Repetitive padding may be applied to obtain one or more sample values used in interpolation for prediction of P1 and P3 regions shown in FIG. 12.

To predict the portion that corresponds to P0 and P2 regions, when interpolation is needed, one or more neighboring samples may be obtained by repetitive padding (e.g., by repeating one or more samples at the right edge of the picture using the cyclic property of the 360-degree video). Fetching of one or more samples from the left edge of the picture may be skipped. To obtain the two motion vectors for each of the two parts, for the first part that corresponds to P1 and P3 regions, the motion vector may remain unmodified. For the second part that corresponds to P0 and P2 regions, modulo operation may be applied to the horizontal component of the motion vector, e.g., to achieve the wrap-around effect as described herein.

Data may be accessed outside of the cache. For horizontal geometry padding, the wrapping operation may be restricted to skip fetching one or more samples located outside of the cached data. For example, horizontal geometry padding may be performed within a given range $S_L$ ($S_L \leq$ face_width_in_luma_samples, $S_C$ S/SubWidthC), which may be related to the cache size. For one or more samples located outside of the cached data, repetitive padding may be applied outside of this range. Eqs. (15) and (18) may be replaced by Eqs. (19) and (20), respectively.

$$\tilde{x}_L = \begin{cases} F_L - S_L, & x_L < -S_L \\ x_L + F_L, & -S_L \leq x_L < 0 \\ x_L - F_L, & W_L - 1 < x_L \leq W_L - 1 + S_L \\ W_L - 1 + S_L - F_L, & W_L - 1 + S_L < x_L \\ x_L, & \text{otherwise} \end{cases} \quad (19)$$

$$\tilde{x}_C = \begin{cases} F_C - S_C, & x_C < -S_C \\ x_C + F_C, & -S_C \leq x_C < 0 \\ x_C - F_C, & W_C - 1 < x_C \leq W_C - 1 + S_C \\ W_C - 1 + S_C - F_C, & W_C - 1 + S_C < x_C \\ x_C, & \text{otherwise} \end{cases} \quad (20)$$

Figure 15:
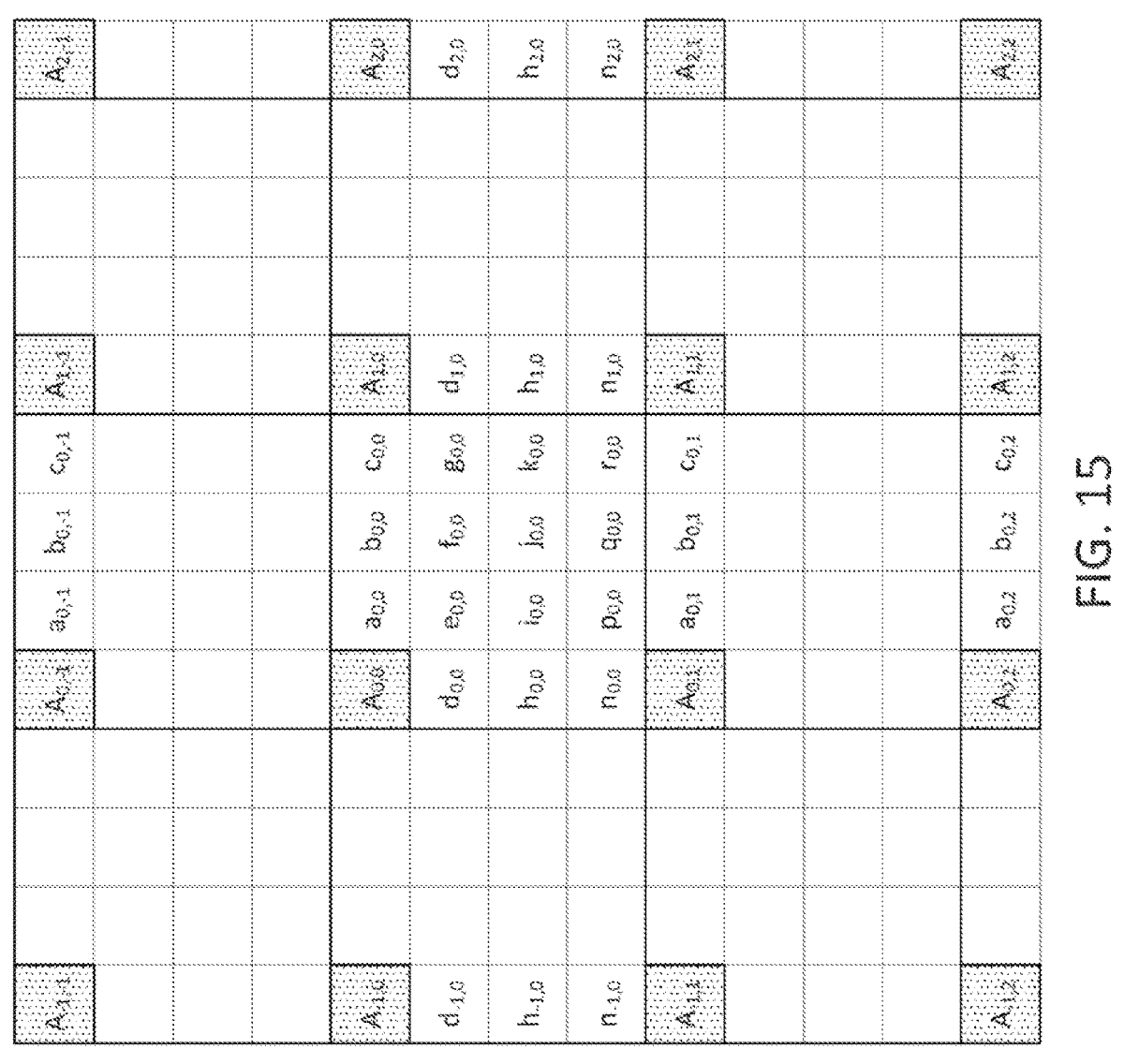

When interpolating one or more samples at fractional sample locations, the one or more samples at full-sample locations used by the interpolation filter may be derived, e.g., as shown in Table 4 and/or Table 5 for the luma and chroma components, respectively. For example, considering the situation depicted in FIG. 15, the luma samples $a_{0,0}$ to $r_{0,0}$ at fractional sample positions may be interpolated using the luma samples $A_{i,j}$ at full-sample locations ($xA_{i,j}$, $yA_{i,j}$). For a luma sample $A_{i,j}$ at full-sample locations, the $xA_{i,j}$ and $yA_{i,j}$ coordinates may be derived, e.g., as shown in Table 4 and/or Table 5 for the luma and chroma components, respectively.

Figure 16A:
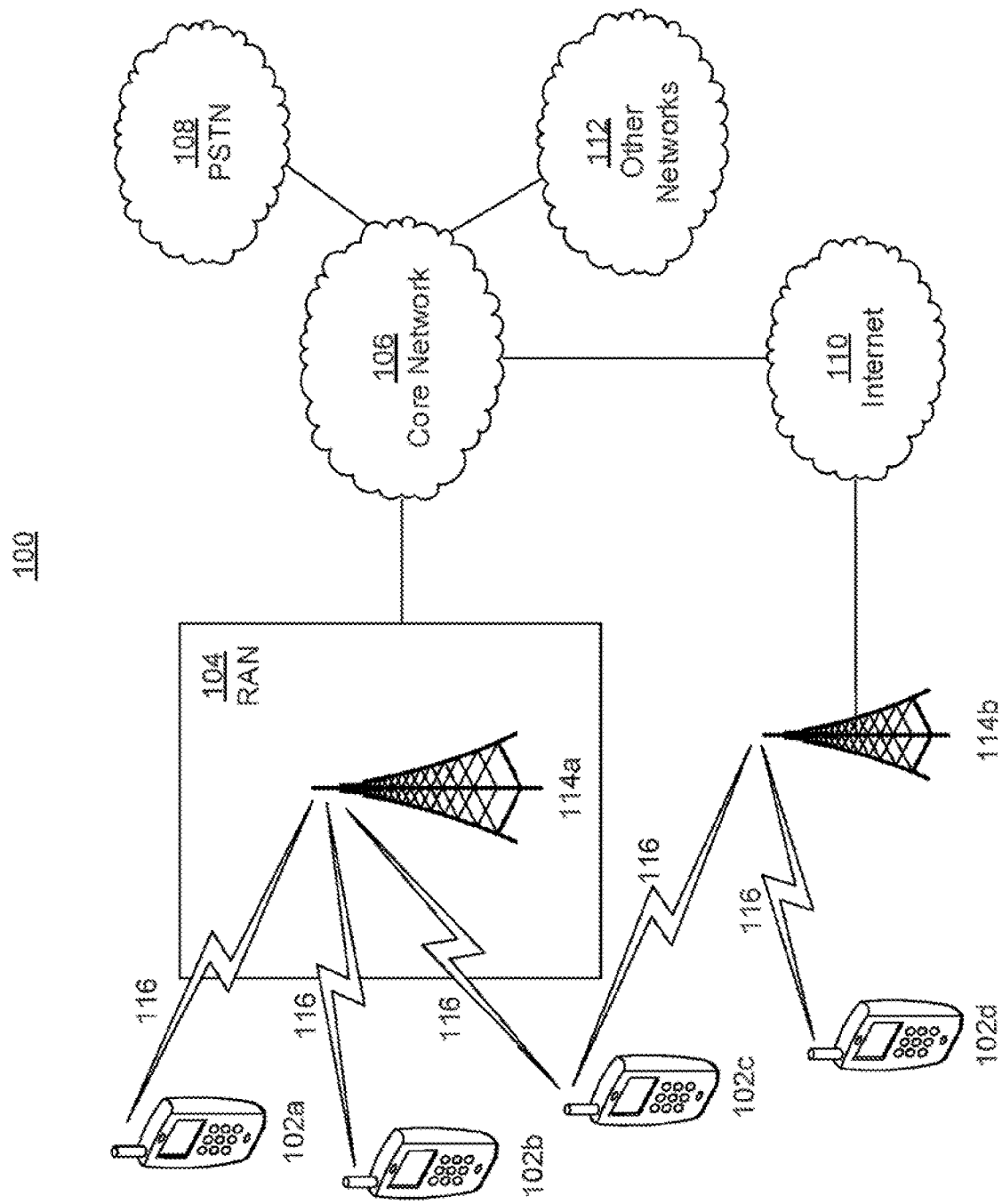
FIG. 16A is a system diagram of an example communications system in which one or more disclosed embodiments may be implemented.

FIG. 16A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 16A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c. 102d, any of which may be referred to as a "station" and/or a "STA," may be configured to transmit and/or receive wireless signals and may include a user equipment (UE), a mobile station, a fixed or mobile subscriber unit, a subscription-based unit. a pager, a cellular telephone, a personal digital assistant (PDA). a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller. an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes. etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors, Thus. in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b. 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment the base station 114a and the WTRUs 102a, 102b, 102c may implement a radio technology such as Evolved UMTS Terrestrial Radio Access (E-UTRA), which may establish the air interface 116 using Long Ten Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000. CDMA2000 1×, CDMA2000 EV-DO, Interim Standard 2000 (IS-2000), Interim Standard 95 (IS-95), Interim Standard 856 (IS-856). Global System for Mobile communications (GSM), Enhanced Data rates for GSM Evolution (EDGE), GSM EDGE (GERAN), and the like.

The base station 114b in FIG. 16A may be a wireless router, Home Node B, Home eNode B, or access point, for example, and may utilize any suitable RAT for facilitating wireless connectivity in a localized area. such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 16A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements. data throughput requirements. mobility requirements, and the like. The CN 106/115 may provide call control, billing services, mobile location-based services, pre-paid calling. Internet connectivity, video distribution, etc., and/or perform high-level security functions, such as user authentication. Although not shown in FIG. 16A it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 16A may be configured to communicate with the base station 114a, which may employ a cellular-based radio technology, and with the base station 114b, which may employ an IEEE 802 radio technology.

FIG. 168 is a system diagram illustrating an example WTRU 102. As shown in FIG. 168, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor. a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding. data processing, power control, input/output processing. and/or any other functionality that enables the WTRU 102 to operate in a wireless environment. The processor 118 may be coupled to the transceiver 120, which may be coupled to the transmit/receive element 122. While FIG. 16B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Figure 16B:
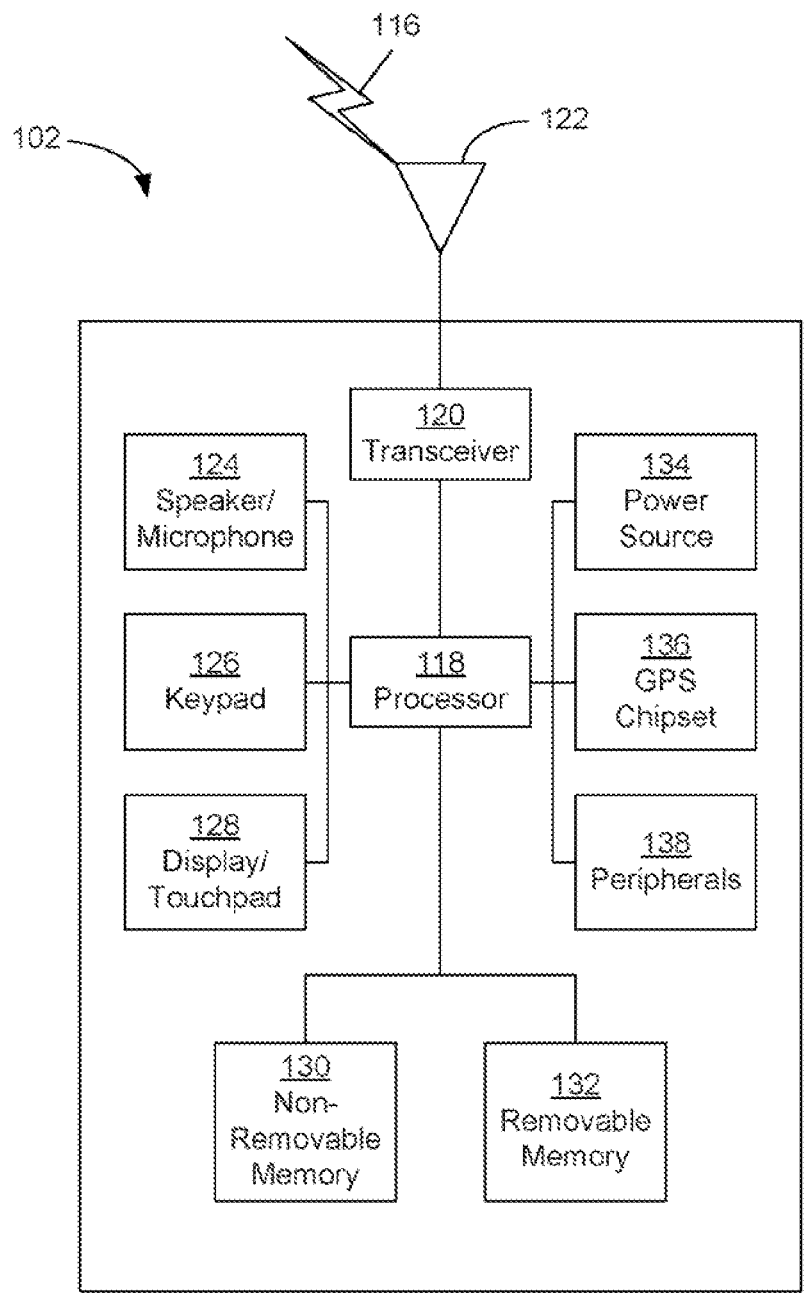
FIG. 16B is a system diagram of an example wireless transmit/receive unit (WTRU) that may be used within the communications system illustrated in FIG. 16A.

Although the transmit/receive element 122 is depicted in FIG. 16B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLEO) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion). etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor: an altimeter, a light sensor, a touch sensor, a magnetometer, a barometer, a gesture sensor, a biometric sensor. and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception).

Figure 16C:
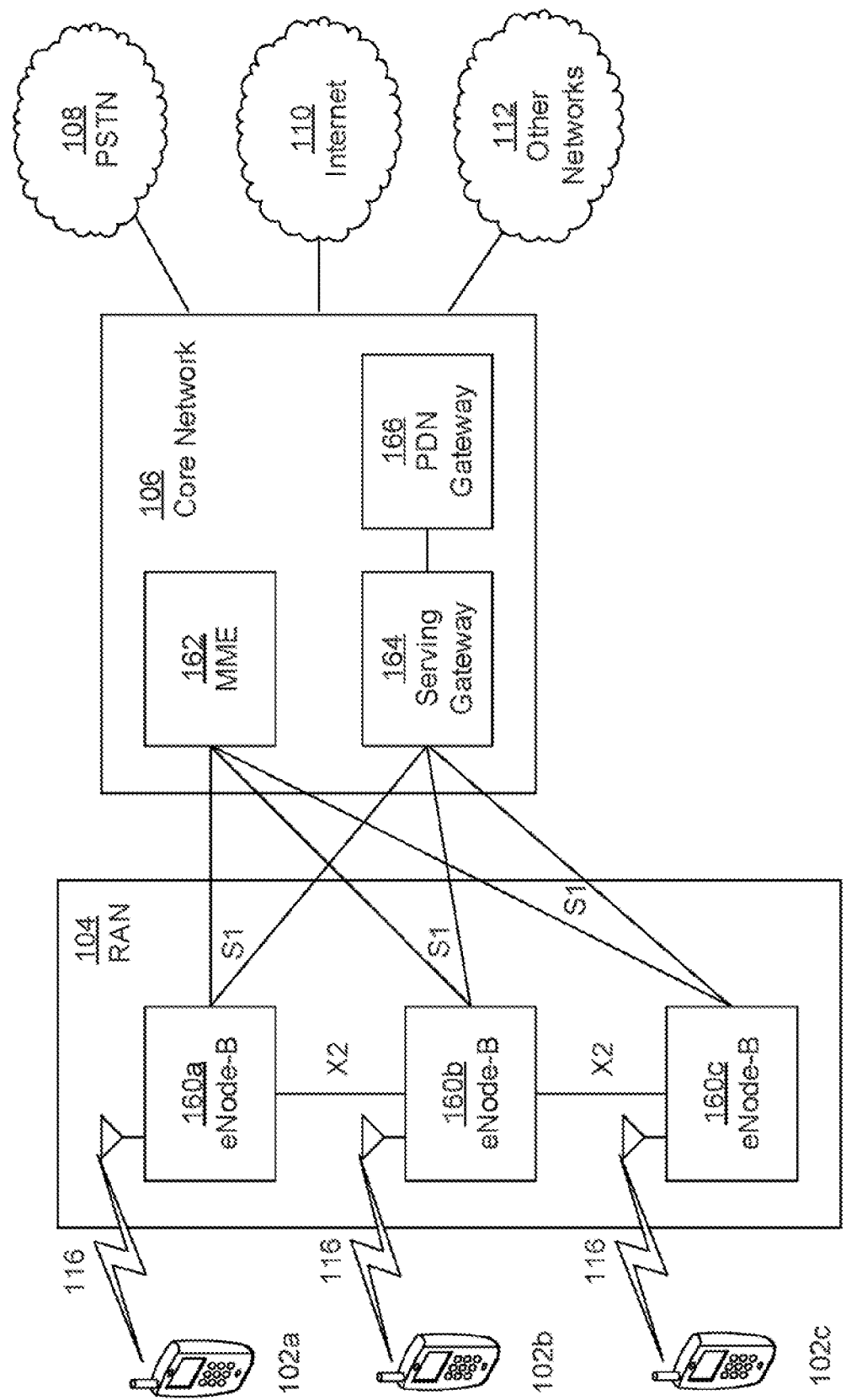
FIG. 16C is a system diagram of an example radio access network (RAN) and an example core network (CN) that may be used within the communications system illustrated in FIG. 16A.

FIG. 16C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a. 160b, 160c may each include one or more transceivers for communicating with the WTRUs 102a. 102b, 102c over the air interface 116. In one embodiment, the eNode-Bs 160a, 160b, 160c may implement MIMO technology. Thus, the eNode-B 160a, for example. may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 16C, the eNode-Bs 160a, 160b, 160c may communicate with one another over an X2 interface.

The CN 106 shown in FIG. 16C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a. 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a. 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108. to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a. 102b, 102c with access to the other networks 112, which may include other wired and/or wireless networks that are owned and/or operated by other service providers Although the WTRU is described in FIGS. 16A-16D as a wireless terminal, it is contemplated that in certain representative embodiments that such a terminal may use (e.g., temporarily or permanently) wired communication interfaces with the communication network.

In representative embodiments. the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AR for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments. Carrier Sense Multiple Access with Collision Avoidance (CSMA/CA) may be implemented, for example in in 802.11 systems. For CSMA/CA. the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz. 80 MHz, and/or 160 MHz wide channels. The 40 MHz. and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11 ac. 802.11af supports 5 MHz, 10 MHz and 20 MHz bandwidths in the TV White Space (TVWS) spectrum, and 802.11ah supports 1 MHz, 2 MHz, 4 MHz. 8 MHz, and 16 MHz bandwidths using non-NWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11at and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz. 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 16O is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b. 102c over the air interface 116. In one embodiment, the gNBs 180a, 180b. 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b. 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a. 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Figure 16D:
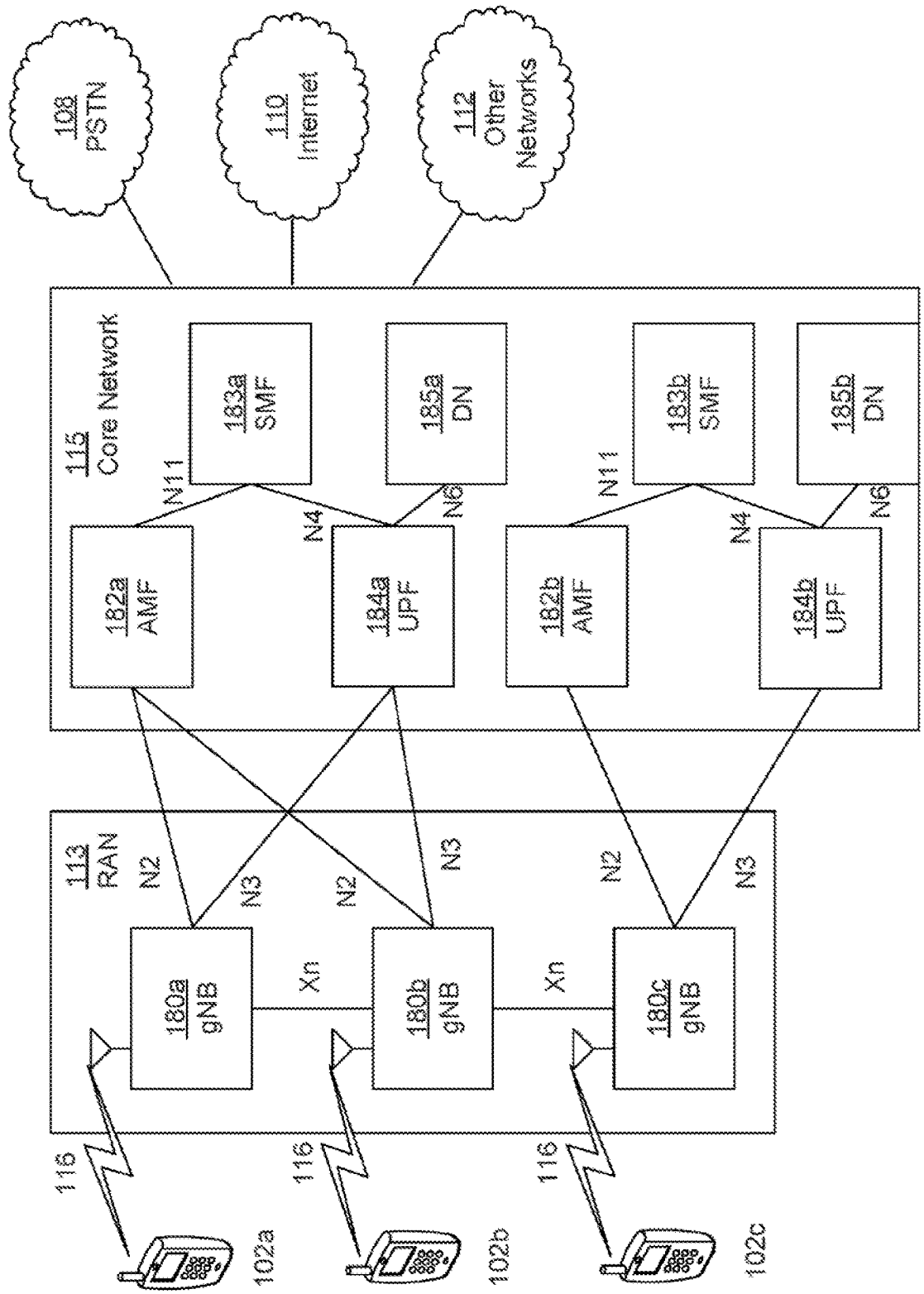
FIG. 16D is a system diagram of further example RAN and a further example CN that may be used within the communications system illustrated in FIG. 16A.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 16D, the gNBs 180a, 180b, 180c may communicate with one another over an Xn interface.

The CN 115 shown in FIG. 16D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a. 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a. 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-horned PDU sessions, handling user plane QoS, buffering downlink packets, providing mobility anchoring, and the like.

The CN 115 may facilitate communications with other networks. For example, the CN 115 may include, or may communicate with, an IP gateway (e.g.; an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment. the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 16A-16D, and the corresponding description of FIGS. 16A-16D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The processes and techniques described herein may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM). a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A method for video decoding, the method comprising:
   obtaining a current block location in a current picture, wherein the current block location is associated with a current block;
   based on the current block location, obtaining a co-located block location, wherein the co-located block location is associated with a co-located block, and wherein the co-located block comprises a first subarea and a second subarea;
   determining that the second subarea is located outside of a boundary of the current picture;
   based on the determination that the second subarea is located outside of the boundary of the current picture, obtaining a second subarea location, wherein the second subarea location is located on the other side of the boundary of the current picture;
   determining whether a first sample value from the first subarea has been cached and determining whether a second sample value from the second subarea has been cached; and
   based on a determination that first sample value from the first subarea has been cached and based on a determination that the second sample value from the second subarea has been cached, decoding the current block based on the first sample value that has been cached and the second sample value that has been cached.

2. The method of claim 1, wherein determining whether the first sample value has been cached and determining whether the second sample value has been cached comprises:
determining whether a first plurality of samples in the first subarea has been cached in a memory and determining whether a second plurality of samples in the second subarea has been cached in the memory.

3. The method of claim 1, wherein the method comprises:
obtaining the second sample value from the second subarea location.

4. The method of claim 3, wherein the second subarea location is obtained based on a wraparound indication.

5. The method of claim 1, wherein the first subarea is located within the boundary of the current picture.

6. The method of claim 1, wherein the first subarea is associated with the current block location and the second subarea is associated with the co-located block location.

7. The method of claim 1, wherein the method comprises at least one of:
based on a determination that the first sample value from the first subarea has not been cached performing repetitive padding to obtain the first sample value or based on a determination that the second sample value from the second subarea has not been cached, performing repetitive padding to obtain the second sample value.

8. The method of claim 1, wherein the current picture is associated with at least one of an equirectangular projection format, an equal-area projection format, or an adjusted equal-area projection format.

9. The method of claim 1, wherein the current picture is associated with a 360-degree video content.

10. An apparatus for video decoding, the apparatus comprising:
a processor configured to:
obtain a current block location in a current picture, wherein the current block location is associated with a current block;
based on the current block location, obtain a co-located block location, wherein the co-located block location is associated with a co-located block, and wherein the co-located block comprises a first subarea and a second subarea;
determine that the second subarea is located outside of a boundary of the current picture;
based on the determination that the second subarea is located outside of the boundary of the current picture, obtain a second subarea location, wherein the second subarea location is located on the other side of the boundary of the current picture;
determine whether a first sample value from the first subarea has been cached and determining whether a second sample value from the second subarea has been cached; and
based on a determination that first sample value from the first subarea has been cached and based on a determination that the second sample value from the second subarea has been cached, decode the current block based on the first sample value that has been cached and the second sample value that has been cached.

11. The apparatus of claim 10, wherein to determine whether the first sample value has been cached and to determine whether the second sample value has been cached comprise the processor being configured to:
determine whether a first plurality of samples in the first subarea has been cached in a memory and determine whether a second plurality of samples in the second subarea has been cached in the memory.

12. The apparatus of claim 10, wherein the processor configured to:
obtain the second sample value from the second subarea location.

13. The apparatus of claim 12, wherein the second subarea location is obtained based on a wraparound indication.

14. The apparatus of claim 10, wherein the first subarea is located within the boundary of the current picture.

15. The apparatus of claim 10, wherein the first subarea is associated with the current block location and the second subarea is associated with the co-located block location.

16. The apparatus of claim 10, wherein the processor is configured to at least one of:
based on a determination that the first sample value from the first subarea has not been cached perform repetitive padding to obtain the first sample value or based on a determination that the second sample value from the second subarea has not been cached, perform repetitive padding to obtain the second sample value.

17. The apparatus of claim 10, wherein the current picture is associated with at least one of an equirectangular projection format, an equal-area projection format, or an adjusted equal-area projection format.

18. The apparatus of claim 10, wherein the current picture is associated with a 360-degree video content.

19. A non-transitory computer readable medium including instructions for palette decoding video data, the instructions causing a processor to perform:
obtaining a current block location in a current picture, wherein the current block location is associated with a current block;
based on the current block location, obtaining a co-located block location, wherein the co-located block location is associated with a co-located block, and wherein the co-located block comprises a first subarea and a second subarea;
determining that the second subarea is located outside of a boundary of the current picture;
based on the determination that the second subarea is located outside of the boundary of the current picture, obtaining a second subarea location, wherein the second subarea location is located on the other side of the boundary of the current picture;
determining whether a first sample value from the first subarea has been cached and determining whether a second sample value from the second subarea has been cached; and
based on a determination that first sample value from the first subarea has been cached and based on a determination that the second sample value from the second subarea has been cached, decoding the current block based on the first sample value that has been cached and the second sample value that has been cached.

20. The non-transitory computer readable medium of claim 19, wherein the second subarea location is obtained based on a wraparound indication, wherein the first subarea is located within the boundary of the current picture, wherein the first subarea is associated with the current block location and the second subarea is associated with the co-located block location, wherein the current picture is associated with at least one of an equirectangular projection format, an equal-area projection format, or an adjusted equal-area projection format, and wherein the current picture is associated with a 360-degree video content.

* * * * *